United States Patent
Hattori et al.

(10) Patent No.: US 8,239,121 B2
(45) Date of Patent: Aug. 7, 2012

(54) CONTROL UNIT FOR VARIABLE VALVE TIMING MECHANISM

(75) Inventors: Masayoshi Hattori, Toyota (JP); Tsukasa Abe, Gotenba (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 444 days.

(21) Appl. No.: 12/596,451

(22) PCT Filed: Apr. 17, 2008

(86) PCT No.: PCT/IB2008/000934
§ 371 (c)(1), (2), (4) Date: Oct. 19, 2009

(87) PCT Pub. No.: WO2008/129390
PCT Pub. Date: Oct. 30, 2008

(65) Prior Publication Data
US 2010/0131180 A1 May 27, 2010

(30) Foreign Application Priority Data
Apr. 18, 2007 (JP) .................................. 2007-109674

(51) Int. Cl.
*F02N 11/08* (2006.01)

(52) U.S. Cl. ..................... 701/105; 701/112; 123/179.3; 123/179.4

(58) Field of Classification Search .................. 701/101, 701/102, 105, 106, 110, 111, 112, 113, 114, 701/115; 123/179.3, 179.4, 179.1, 179.7, 123/179.14, 179.28, 90.1, 90.11, 90.12, 90.15, 123/90.18, 90.16, 90.17, 90.31, 198 DB, 123/198 F, 190.1; 180/65.28; 903/905
See application file for complete search history.

(56) References Cited

U.S. PATENT DOCUMENTS

| | | | | |
|---|---|---|---|---|
| 6,656,089 B2* | 12/2003 | Furukawa | .................... | 477/111 |
| 7,051,704 B2* | 5/2006 | Kawamura | .................... | 123/322 |
| 7,079,939 B2* | 7/2006 | Kataoka et al. | ............... | 701/112 |
| 7,743,743 B2* | 6/2010 | Inoue et al. | ............... | 123/90.17 |
| 2004/0153235 A1 | 8/2004 | Kataoka et al. | | |
| 2004/0255904 A1 | 12/2004 | Izawa et al. | | |
| 2006/0241851 A1 | 10/2006 | Berger | | |

FOREIGN PATENT DOCUMENTS

| JP | 9 264235 | 10/1997 |
|---|---|---|
| JP | 2000 213383 | 8/2000 |

(Continued)

*Primary Examiner* — Stephen K Cronin
*Assistant Examiner* — Raza Najmuddin
(74) *Attorney, Agent, or Firm* — Oblon, Spivak, McClelland, Maier & Neustadt, L.L.P.

(57) ABSTRACT

A stop-time target phase setting unit sets a target phase CAr for an intake valve to a target phase, which is used when an engine is stopped, in response to issuance of an engine stop command. An engine stop control unit generates a series of control commands for an engine stop process in response to issuance of the engine stop command. A motoring command unit generates a first MG control command for rotating the engine using a motor for a predetermined period Tm that is counted by a timer in response to issuance of the engine stop command. Thus, the engine idles even after fuel combustion stops. In this way, the period in which the valve phase can be changed by a VVT mechanism is increased. As a result, a valve phase when the engine stops is reliably brought to the target phase that is suitable for next engine starting.

16 Claims, 17 Drawing Sheets

FOREIGN PATENT DOCUMENTS

| | | |
|---|---|---|
| JP | 2002 250240 | 9/2002 |
| JP | 2004 19519 | 1/2004 |
| JP | 2004 144030 | 5/2004 |
| JP | 2004 156461 | 6/2004 |
| JP | 2004 263566 | 9/2004 |
| JP | 2004 300924 | 10/2004 |
| JP | 2005 212519 | 8/2005 |
| JP | 2006 347430 | 12/2006 |

* cited by examiner

CONTROL UNIT FOR VARIABLE VALVE TIMING MECHANISM

BACKGROUND OF THE INVENTION

1. Field of the Invention

The invention relates generally to a control unit and control method for a variable valve timing mechanism, and, more specifically to a variable valve timing control that is executed when an internal combustion engine is stopped.

2. Description of the Related Art

A variable valve timing (VVT) mechanism that changes the phase (i.e., crank angle), at which an intake valve or an exhaust valve is opened/closed, based on the engine operating state has been used. Such variable valve timing mechanism usually changes the phase of the intake valve or the exhaust valve by rotating a camshaft, which opens/closes the intake valve or the exhaust valve, relative to, for example, a sprocket. The camshaft is rotated hydraulically or by means of an actuator, for example, an electric motor.

When an engine is stopped, a VVT mechanism usually changes the valve phase toward a target phase that is suitable for next engine starting. For example, Japanese Patent Application Publication No. JP-2004-300924 (JP-A-2004-300924) describes a variable valve control that is executed when an engine is stopped and that is executed over a variable valve mechanism of an engine provided with a three-dimensional cam of which the cam profile is changed in its axial direction and a valve lift amount changing unit that continuously changes the valve lift amount by moving the three-dimensional cam in the camshaft axial direction.

With the variable valve mechanism described in JP-A-2004-300924, when the camshaft needs to be moved in the axial direction when the engine is stopped, the valve lift amount changing unit is driven, and the travel distance of the cam is detected. When the detected travel distance of the cam is shorter than a predetermined value, it is determined whether the period in which the valve lift amount changing unit is driven exceeds a predetermined period. When the period in which the valve lift amount changing unit is driven exceeds the predetermined period, the valve lift amount changing unit is stopped. Thus, it is possible to minimize unnecessary power consumption, thereby increasing the useful life of a battery. In addition, it is possible to minimize overheating due to overload, thereby enhancing the reliability of a system.

However, with the variable valve mechanism described in JP-A-2004-300924, the period in which the valve phase can be changed when the engine stops is limited to the period from when an engine stop command is issued until when the engine actually stops. With a variable valve timing mechanism with which it is difficult to change the valve phase after an engine stops, the amount by which the valve timing can be changed when the engine stops is limited to a relatively small amount. Therefore, there is a possibility that the valve phase when the engine stops does not reach a predetermined valve phase suitable for engine starting, which deteriorates startability when the engine is started next time.

SUMMARY OF THE INVENTION

The invention makes it possible to more reliably bring a valve phase when an engine stops to a valve phase suitable for engine starting by increasing an amount by which the valve phase can be changed after issuance of an engine stop command, thereby ensuring good engine startability in a variable valve timing mechanism with which it is difficult to change the valve phase after the engine stops.

A first aspect of the invention relates to a control unit for a variable valve timing mechanism that changes opening/closing timing of at least one of an intake valve and an exhaust valve of an internal combustion engine by a change amount that corresponds to an operation amount of an actuator. The internal combustion engine is mounted in a vehicle that is provided with a rotary electric machine having an output shaft that is connected to an output shaft of the internal combustion engine via a gear. The control unit includes an actuator control unit, a stop-time position setting unit, a combustion stop processing unit, and a motoring command unit. The actuator control unit controls the operation amount of the actuator based on a deviation of a current value of the opening/closing timing from a target value of the opening/closing timing. The stop-time position setting unit sets the target value to a predetermined value in response to a command to stop the internal combustion engine. The combustion stop processing unit stops fuel combustion in the internal combustion engine in response to the command to stop the internal combustion engine. The motoring command unit rotates the internal combustion engine using the rotary electric machine for a predetermined period in response to the command to stop the internal combustion engine.

With the control unit described above, even after fuel combustion is stopped in the internal combustion engine, the valve opening/closing timing (valve phase) can be changed toward the target phase while the internal combustion engine is rotated by the rotary electric machine (while motoring is executed). Therefore, it is possible to increase the amount by which the valve phase can be changed after issuance of the engine stop command. As a result, the valve phase when the engine stops is more reliably brought to the valve phase suitable for engine starting. Therefore, it is possible to ensure good engine startability.

In the first aspect of the invention, the vehicle may be configured to travel in a cruise mode that is selected from among cruise modes including a first cruise mode in which the vehicle travels using drive power generated by the internal combustion engine and a second cruise mode in which the internal combustion engine is stopped and the vehicle travels using drive power generated by a drive power source that differs from the internal combustion engine, and the command to stop the internal combustion engine may be a first stop command that is automatically issued based on a vehicle state or a second stop command that is issued in response to an operation performed by a driver. The control unit may further include a stop process retardation unit and a switching unit. The stop process retardation unit retards the command to stop the internal combustion engine for a predetermined period and then transmits the command to the combustion stop processing unit. When the first stop command is issued, the switching unit transmits the command to stop the internal combustion engine to the combustion stop processing unit via the stop process retardation unit, and does not transmit the command to stop the internal combustion engine to the motoring command unit. When the second stop command is issued, the switching unit transmits the command to stop the internal combustion engine to the motoring command unit and transmits the command to stop the internal combustion engine to the combustion stop processing unit in such a manner that the command does not pass through the stop process retardation unit.

With this configuration, in a case of an engine automatic stop, which may frequently occur while the vehicle is traveling, the amount by which the valve phase can be changed is increased by increasing the period from when the engine stop command is issued until when fuel combustion is stopped in the engine based on the fact that retardation of an engine stop is not likely to give a sense of discomfort to the driver in such a case. As a result, when the engine is automatically stopped, it is possible to avoid the situation in which the atmosphere in a combustion chamber becomes the lean atmosphere due to motoring and therefore the exhaust emission is influenced by an increase in, for example, NOx when the engine is started next time.

In the first aspect of the invention, the motoring command unit may control the rotary electric machine so that the internal combustion engine is rotated at a target idle speed by the rotary electric machine.

With this configuration, it is possible to increase the amount by which the valve phase can be changed after issuance of the engine stop command by executing motoring, without giving a sense of severe discomfort to the driver.

In the first aspect of the invention, the control unit may further include a motoring non-execution determination unit. The motoring non-execution determination unit instructs the motoring command unit not to rotate the internal combustion engine using the rotary electric machine when a predetermined condition is satisfied. The predetermined condition, is satisfied, if a storage unit that supplies electric power used to operate the rotary electric machine is in a predetermined state when the command to stop the internal combustion engine is issued. The motoring non-execution determination unit determines whether the internal combustion engine should be rotated by the rotary electric machine based on the remaining capacity and the temperature of the storage unit.

With this configuration, when there is a possibility that the storage unit, which is an electric power source for the rotary electric machine that executes motoring, cannot supply a sufficient amount of electric power due to a decrease in the temperature of the remaining capacity, it is possible to avoid the situation in which the storage unit is damaged due to execution of motoring and therefore the engine startability deteriorates.

In the first aspect of the invention, the control unit may further include a motoring non-execution determination unit. The motoring non-execution determination unit instructs the motoring command unit not to rotate the internal combustion engine using the rotary electric machine if the temperature of the internal combustion engine is higher than a predetermined value when the command to stop the internal combustion engine is issued.

With this configuration, when the engine is warm, that is, when friction at each element of the engine is relatively small, it is determined that the amount by which the valve phase can be changed need not be increased and the engine is stopped without executing motoring. Therefore, it is possible to minimize unnecessary power consumption.

In the first aspect of the invention, the control unit may further include a motoring non-execution determination unit. The motoring non-execution determination unit instructs the motoring command unit not to rotate the internal combustion engine using the rotary electric machine if the deviation of the current value of the opening/closing timing from the target value of the opening/closing timing is equal to or smaller than a predetermined value when the command to stop the internal combustion engine is issued.

With this configuration, when the valve phase deviation when the command to stop the engine is issued is small, it is determined that the amount by which the valve phase can be changed need not be increased and therefore the engine is stopped without executing motoring. Therefore, it is possible to minimize unnecessary power consumption.

A second aspect of the invention relates to a control method for a variable valve timing mechanism that changes opening/closing timing of at least one of an intake valve and an exhaust valve of an internal combustion engine by a change amount that corresponds to an operation amount of an actuator. The internal combustion engine being mounted in a vehicle that is provided with a rotary electric machine having an output shaft that is connected to an output shaft of the internal combustion engine via a gear. According to the control method, the operation amount of the actuator is controlled based on a deviation of a current value of the opening/closing timing from a target value of the opening/closing timing, and the target value is set to a predetermined value in response to a command to stop the internal combustion engine. Fuel combustion is stopped in the internal combustion engine in response to the command to stop the internal combustion engine, and the internal combustion engine is rotated using the rotary electric machine for a predetermined period in response to the command to stop the internal combustion engine.

According to the aspects of the invention described above, it is possible to more reliably bring the valve phase when the engine stops to the valve phase suitable for engine starting by increasing the amount by which the valve phase can be changed after issuance of an engine stop command, thereby ensuring good engine startability in the variable valve timing mechanism with which it is difficult to change the valve phase after the engine stops.

BRIEF DESCRIPTION OF THE DRAWINGS

The foregoing and further features and advantages of the invention will become apparent from the following description of an embodiment with reference to the accompanying drawings, wherein the same or corresponding elements will be denoted by the same reference numerals and wherein.

DETAILED DESCRIPTION OF THE EMBODIMENT

Figure 1:
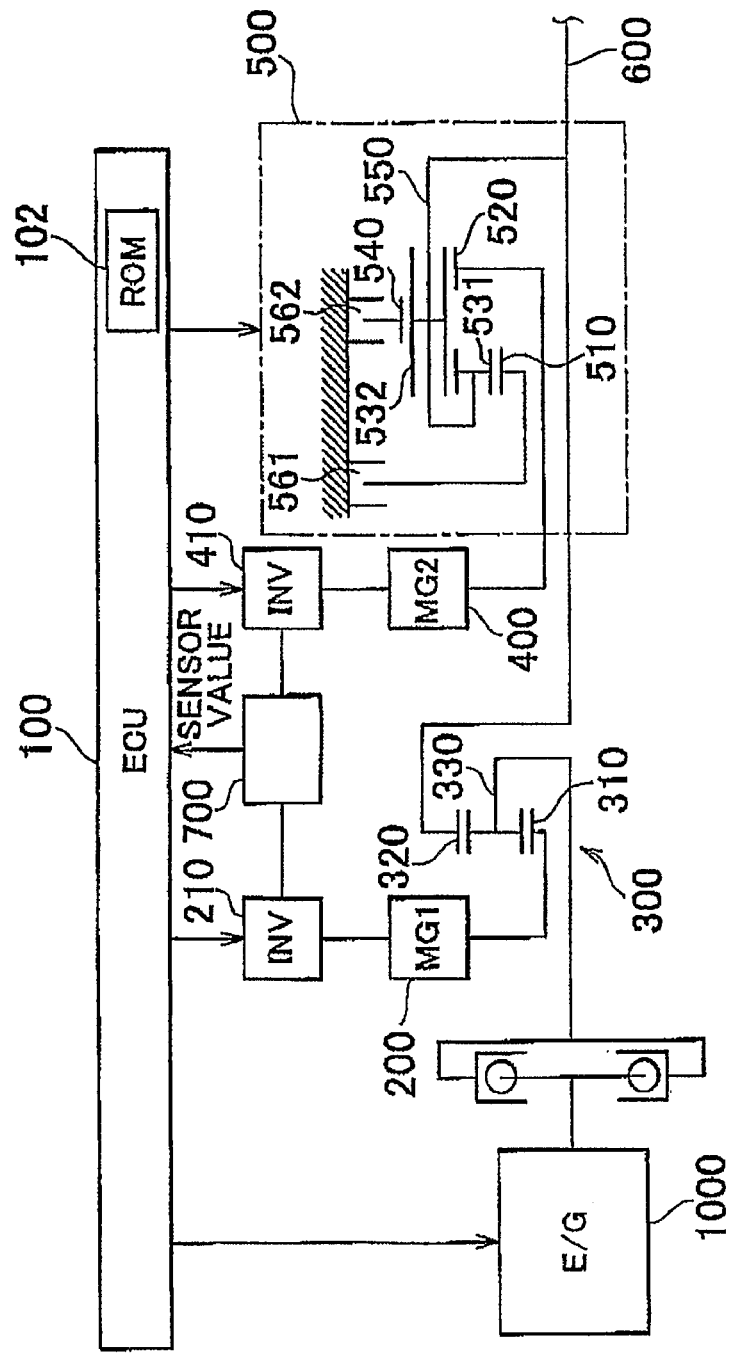
FIG. 1 is a view schematically showing the structure of a power train of a hybrid vehicle.

Hereafter, an embodiment of the invention will be described with reference to the accompanying drawings. In the following description, the same or corresponding elements will be denoted by the same reference numerals. The names and functions of the elements having the same reference numerals are also the same. Accordingly, the descriptions concerning the elements having the same reference numerals will be provided only once below.

A power train of a hybrid vehicle provided with a control unit according to an embodiment of the invention will be described with reference to FIG. 1. The control unit according to the embodiment of the invention is implemented when an ECU (Electronic Control Unit) 100 executes a program stored in a ROM (Read Only Memory) 102 of the ECU 100. The ECU 100 may be divided into multiple ECUs. The program that is executed by the ECU 100 may be recorded in a CD (Compact Disc) or a DVD (Digital Versatile Disc), and distributed to the market.

As shown in FIG. 1, the power train is formed mainly of an engine 1000, a first MG (Motor Generator) 200, a power split mechanism 300, a second MG 400, and a transmission 500. The power split mechanism 300 is provided between the engine 1000 and the first MG 200. The power split mechanism 300 combines the torque from the engine 1000 with the torque from the first MG 200, or splits the torque from the engine 1000 into the torque that is transferred to the first MG 200 and the torque that is transferred to drive wheels.

The engine 1000 is a known power unit that burns fuel to generate drive power. The operating state of the engine 1000 such as the throttle valve opening amount (intake air amount), the fuel supply amount, and the ignition timing is controlled electrically. The control is executed by the ECU 100 that is formed mainly of a microcomputer. The engine 1000 will be described later in detail.

The first MG 200 is, for example, a three-phase alternating current rotary electric machine, and is structured to function as an electric motor (motor) and function also as a generator. The first MG 200 is connected to a storage unit 700, for example, a battery, via an inverter 210. The output torque from the first MG 200 or the regenerative torque is appropriately adjusted by controlling the inverter 210. The inverter 210 is controlled by the ECU 100. A stator (not shown) of the first MG 200 is locked so as not to rotate.

The power split mechanism 300 is a known gear mechanism that produces a differential effect by using three rotational elements, that is, a sun gear (S) 310 which is an external gear, a ring gear (R) 320 which is an internal gear arranged coaxially with the sun gear (S) 310, and a carrier (C) 330 that supports pinions which are in mesh with the sun gear (S) 310 and the ring gear (R) 320 in such a manner that the pinions are allowed to rotate about their axes and turn around the sun gear (S) 310. An output shaft of the engine 1000 is connected to the carrier (C) 330, which is a first rotational element, via a damper. In other words, the carrier (C) 330 serves as an input element.

A rotor (not shown) of the first MG 200 is connected to the sun gear (S) 310, which is a second rotational element. Therefore, the sun gear (S) 310 serves as a so-called reaction force element, and the ring gear (R) 320, which is a third, rotational element, serves as an output element. The ring gear (R) 320 is connected to an output shaft 600 that is connected to the drive wheels (not shown). That is, the first MG 200, which corresponds to a "rotary electric machine" according to the invention, has a rotor (output shaft) that is connected to the output shaft of the engine 1000 via a gear.

Figure 2:
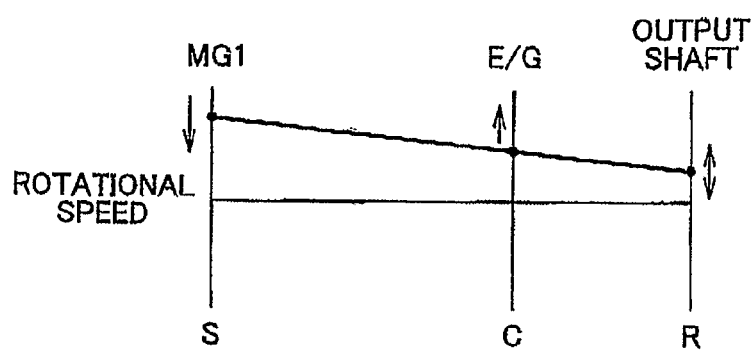
FIG. 2 is a collinear diagram for a power split mechanism.

FIG. 2 is a collinear diagram for the power split mechanism 300. As shown in FIG. 2, when the torque from the first MG 200 is input in the sun gear (S) 310 as the reaction torque for the torque which is output from the engine 1000 and input in the carrier (C) 330, the ring gear (R) 320, which serves as an output element, outputs a torque that is obtained by increasing or decreasing the torque output from the engine 1000 using the reaction torque. In this case, the rotor of the first MG 200 is rotated by this torque, and the first MG 200 serves as a generator. If the rotational speed (output rotational speed) of the ring gear (R) 320 is constant, the rotational speed of the engine 1000 may be continuously (steplessly) changed by adjusting the rotational speed of the first MG 200. That is, a control for setting the rotational speed of the engine 1000 to a value, at which the optimum fuel efficiency is achieved, is executed by controlling the first MG 200. The ECU 100 executes the control.

When the engine 1000 is stopped while the vehicle is traveling, the first MG 200 is rotating in the reverse direction. In this state, if the first MG 200 is used as an electric motor to produce a torque that is applied in the forward rotational direction, a torque, which is applied in such a direction that the engine 1000 is rotated in the forward direction, is applied to the engine 1000 that is connected to the carrier (C) 330. Thus, the engine 1000 is started by the first MG 200 (motoring or cranking). In this case, a torque, which is applied in such a direction that the rotation of the output shaft 600 is stopped, is applied to the output shaft 600. Therefore, the drive torque used to allow the vehicle to travel is maintained by controlling the torque that is output from the second MG 400, and, at the same time, the engine 1000 is started smoothly. This type of hybrid drive system is called a mechanical split type hybrid system or a split type hybrid system.

Referring again to FIG. 1, the second MG 400 is, for example, a three-phase alternating current rotary electric machine, and is structured to function as an electric motor and function also as a generator. The second MG 400 is connected to the storage unit 700, for example, a battery, via an inverter 410. The torque that is obtained by the powering operation and the torque that is obtained by the regenerative operation are adjusted by controlling the inverter 410. A stator (not shown) of the second MG 400 is locked so as not to rotate.

The storage unit 700 is used as an electric power source for The first MG 200 and the second MG 400. The storage unit 700 is provided with multiple sensors (not shown), and signals indicating the temperature and the voltage of the storage unit 700, and the electric currents supplied to and discharged from the storage unit 700, which are detected by these sensors, are transmitted to the ECU 100. The ECU 100 estimates the state of charge (SOC) of the storage unit 700 based on the values detected by these sensors. The SOC is usually indicated by the charging rate (%). The SOC is indicated as 100% when the storage unit 700 is fully charged, whereas the SOC is indicated as 0% when the storage unit 700 is not charged at all. In a hybrid vehicle, the SOC is usually controlled to an intermediate value (50% to 60%) so that the storage unit 700 is able to receive regenerative electric power and also the storage unit 700 can immediately supply electric power upon request.

The transmission 500 is formed of a set of Ravigneaux planetary gear mechanism. The transmission 500 includes a first sun gear (S1) 510 and a second sun gear (S2) 520, which are external gears, First pinions 531 are in mesh with the first sun gear (S1) 510, the first pinions 531 are in mesh with second pinions 532, and the second pinions 532 are in mesh with a ring gear (R) 540 that is arranged coaxially with the sun gears 510 and 520.

The pinions 531 and 532 are supported by a carrier (C) 550 in such a manner that the pinions 531 and 532 are allowed to rotate about their axes and turn around the sun gears 510 and 520. The second sun gear (S2) 520 is in mesh with the second pinions 532. Therefore, the first sun gear (Si) 510 and the ring gear (R) 540 together with the pinions 531 and 532 constitute a mechanism that corresponds to a double-pinion planetary gear mechanism. The second sun gear (S2) 520 and the ring gear (R) 540 together with the second pinions 532 constitute a mechanism that corresponds to a single-pinion planetary gear mechanism.

The transmission 500 further includes a B1 brake 561 that selectively locks the first sun gear (S1) 510, and a B2 brake 562 that selectively locks the ring gear (R) 540. These brakes 561 and 562 are so-called, friction engaging elements that generate engagement force using frictional force. Multi-disc engaging devices or band-type engaging devices may be used as the brakes 561 and 562. Each of the brakes 561 and 562 is structured so that the torque capacity thereof is continuously changes based on the engaging force that is hydraulically generated. In addition, the second MG 400 is connected to the second sun gear (S2) 520. The carrier (C) 550 is connected to the output shaft 600.

Therefore, in the transmission 500, the second sun gear (S2) 520 serves as a so-called input element, and the carrier (C) 550 serves as an output element. When the B1 brake 561 is engaged, a high gear, of which the gear ratio is higher than "1", is selected. When the B2 brake 562 is engaged instead of the B1 brake 561, a low gear, of which the gear ratio is higher than the gear ratio of the high gear, is selected.

The transmission 500 is shifted between these gears based on the vehicle drive state such as a vehicle speed and a required drive power (or an accelerator pedal operation amount). More specifically, shift ranges are set in advance in the form of a map (shift diagram), and a control is executed to select one of the gears based on the detected vehicle drive state.

Figure 3:
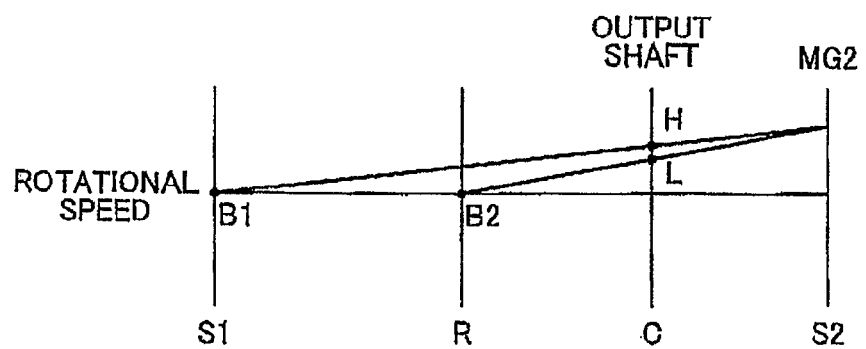
FIG. 3 is a collinear diagram for a transmission.

FIG. 3 is a collinear diagram for the transmission 500. As shown in FIG. 3, when the ring gear (R) 540 is locked by the B2 brake 562, a low gear L is selected, and the torque output from the second MG 400 is amplified based on the gear ratio, and the amplified torque is applied to the output shaft 600.

When the first sun gear (S1) 510 is locked by the B1 brake 561, a high gear H, of which the gear ratio is lower than that of the low gear. L, is selected. The gear ratio of the high gear H is also higher than "1". Therefore, the torque output from the second MG 400 is amplified based on the gear ratio, and the amplified torque is applied to the output shaft 600.

When the low gear L or the high gear H is maintained, the torque that is obtained by amplifying the torque output from the second MG 400 based on the gear ratio is applied to the output shaft 600. However, when the gears are being shifted, the torque, which is influenced by the torque capacities of the brakes 561 and 562 and the inertia torque due to a change in the rotational speed, is applied to the output shaft 600. The torque that is applied to the output shaft 600 is a positive torque when the second. MG 400 is in the drive state, and is a negative torque when the second MG 400 is in the driven state.

In the embodiment of the invention, the hybrid vehicle travels in one of a first cruise mode in which the hybrid vehicle travels using only the drive power generated by the engine 1000, a second cruise mode in which the engine 1000 is stopped and the hybrid vehicle travels using only the drive power generated by the second MG 400, and a third cruise mode in which the hybrid vehicle travels using both the drive power generated by the engine 1000 and the drive power generated by the second MG 400. The cruise mode is selected based on various parameters such as the accelerator pedal operation amount, and the remaining capacity of the storage unit 700.

A technology known in the technical field that pertains to hybrid vehicles may be used to form a method for selecting the cruise mode. Therefore, the detailed description on the method for selecting the cruise mode will not be provided below. In addition, the number of cruise modes is not limited to three.

The engine 1000 will be described in further detail with reference to FIG. 4. The engine 1000 is an eight-cylinder V-type engine including an "A" bank 1010 and a "B" bank 1012 each of which has four cylinders therein. Note that, engines other than an eight-cylinder V-type engine may be used.

Air that has passed through an air cleaner 1020 is supplied to the engine 1000. A throttle valve 1030 adjusts the amount of air supplied to the engine 1000. The throttle valve 1030 is an electronically-controlled throttle valve that is driven by a motor.

The air is introduced into a cylinder 1040 through an intake passage 1032. The air is then mixed with fuel in the cylinder 1040 (combustion chamber). The fuel is injected from an injector 1050 directly into the cylinder 1040. Namely, the injection hole of the injector 1050 is positioned within the cylinder 1040.

The fuel is injected into the cylinder 1040 in the intake stroke. The time at which the fuel is injected need not be in the intake stroke. The description concerning the embodiment of the invention will be provided on the assumption that the engine 1000 is a direct-injection engine where the injection hole of the injector 1050 is positioned within the cylinder 1040. In addition to the injector 1050 for direct-injection, an injector for port-injection may be provided. Alternatively, only an injector for port-injection may be provided.

The air-fuel mixture in the cylinder 1040 is ignited by a spark plug 1060, and then burned. The burned air-fuel mixture, namely, the exhaust gas, is purified by a three-way catalyst 1070, and then discharged to the outside of the vehicle. A piston 1080 is pushed down due to combustion of the air-fuel mixture, whereby a crankshaft 1090 is rotated.

An intake valve 1100 and an exhaust valve 1110 are provided on the top of the cylinder 1040. The intake valve 1100 is driven by an intake camshaft 1120, and the exhaust valve 1110 is driven by an exhaust camshaft 1130. The intake camshaft 1120 and the exhaust camshaft 1130 are connected to each other by, for example, a chain or a gear, and rotate at the same rotational speed. Because the number of revolutions (typically, the number of revolutions per minute (rpm)) of a rotating body, for example, a shaft is usually referred to as the rotational speed, the term "rotational speed" will be used in the following description.

The phase (opening/closing timing) of the intake valve 1100 is controlled by an intake VVT mechanism 2000 which is fitted to the intake camshaft 1120. The phase (opening/closing timing) of the exhaust valve 1110 is controlled by an exhaust VVT mechanism 3000 which is fitted to the exhaust camshaft 1130.

In the embodiment of the invention, the intake camshaft 1120 and the exhaust camshaft 1130 are rotated by the VVT mechanisms 2000 and 3000, respectively, whereby the phase of the intake valve 1100 and the phase of the exhaust valve 1110 are controlled. However, the method for controlling the phase of the intake valve 1100 is not limited to this.

Figure 4:
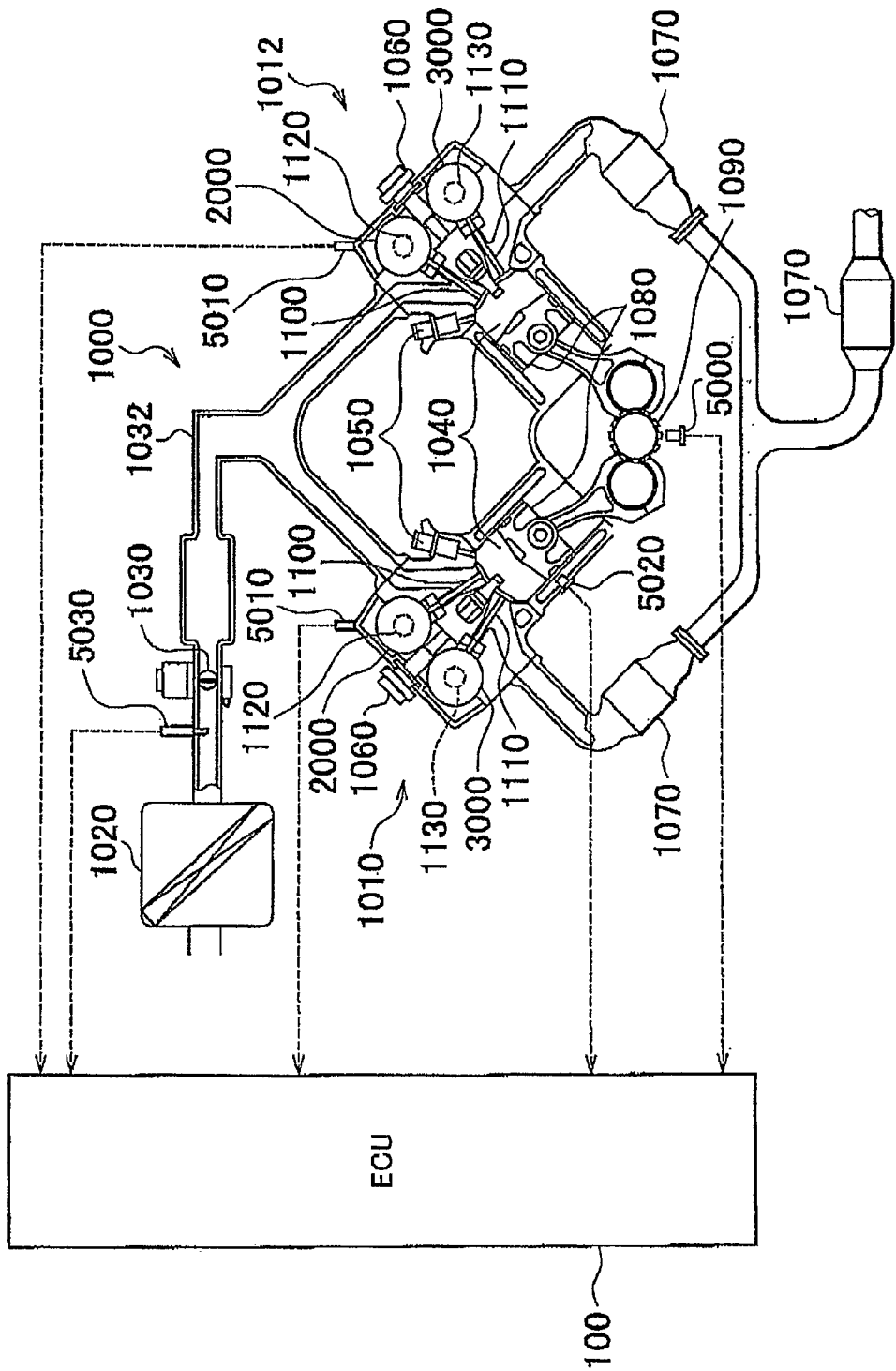
FIG. 4 is a view schematically showing the structure of an engine of the hybrid vehicle.

The intake VVT mechanism 2000 is operated by an electric motor 2060 (not shown in FIG. 4). The electric motor 2060 is controlled by the ECU 100. The magnitude of electric current passing through the electric motor 2060 is detected by an ammeter (not shown) and the voltage applied to the electric motor 2060 is detected by a voltmeter (not shown), and a signal indicating the magnitude of electric current and a signal indicating the voltage are transmitted to the ECU 100.

The exhaust VVT mechanism 3000 is hydraulically operated. Note that, the intake VVT mechanism 2000 may be hydraulically operated. Note that, the exhaust VVT mechanism 3000 may be operated by means of an electric motor.

The ECU 100 receives signals indicating the rotational speed and the crank angle of the crankshaft 1090 from a crank angle sensor 5000. The ECU 100 also receives a signal indicating the phase of the intake camshaft 1120 and a signal indicating the phase of the exhaust camshaft 1130 (the positions of these camshafts in the rotational direction), from a camshaft position sensor 5010. In other words, the ECU 100 receives a signal indicating the phase of the intake valve 1100 and a signal indicating the phase of the exhaust valve 1110 from the cam position sensor 5010. In addition, the ECU 100 receives a signal indicating the rotational speed of the intake cam shaft 1120 and a signal indicating the rotational speed of the exhaust camshaft 1130 from the cam position sensor 5010.

In addition, the ECU 100 receives a signal indicating the temperature of a coolant for the engine 1000 (the coolant temperature) from a coolant temperature sensor 5020, and a signal indicating the amount of air taken in the engine 1000 from an airflow meter 5030.

Further, the ECU 100 receives a signal indicating the rotational speed of an output shaft of the electric motor 2060 from a rotational speed sensor 5040.

The ECU 100 controls the throttle valve opening amount, the ignition timing, the fuel injection timing, the fuel injection amount, the phase of the intake valve 1100, the phase of the exhaust valve 1110, etc. based on the signals received from the above-mentioned sensors and the maps and programs that are stored in a memory (not shown) so that the engine 1000 is placed in the desired operating state.

Figure 5:
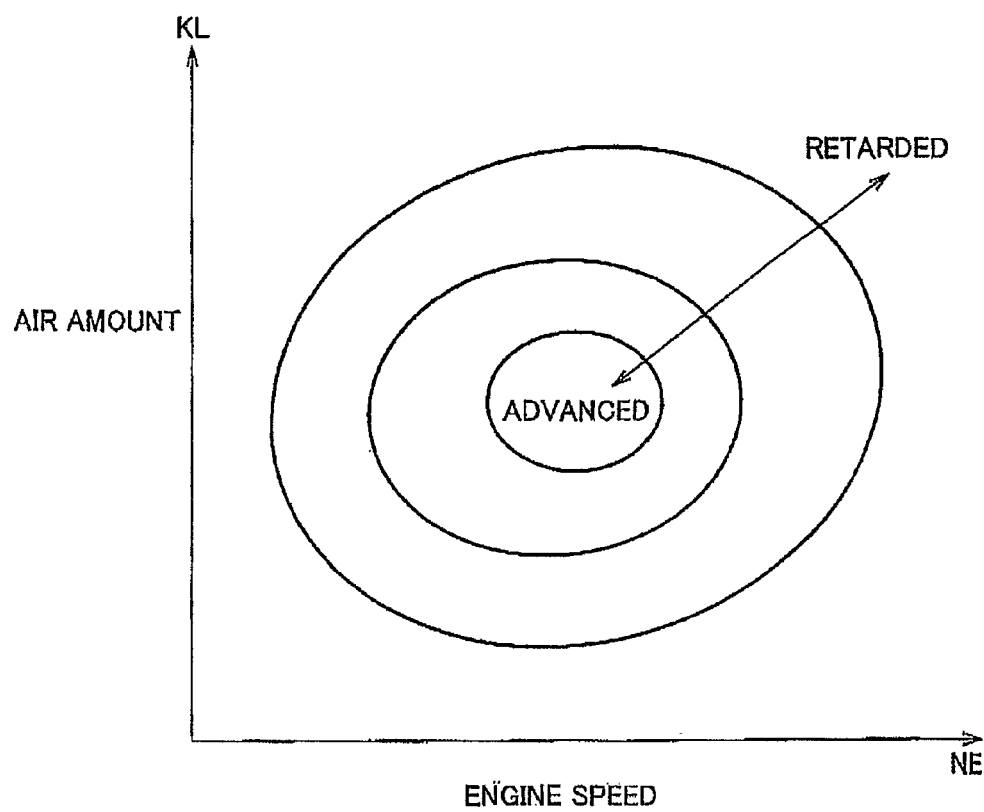
FIG. 5 is a graph showing a map that defines the phase of an intake valve.

According to the embodiment of the invention, the ECU 100 sets the phase of the intake valve 1100 based on the map that uses an engine speed NE and an intake air amount KL as parameters, as shown in FIG. 5. Multiple maps, used to set the phase of the intake valve 1100 at multiple coolant temperatures, are stored in the memory.

Hereafter, the intake VVT mechanism 2000 will be described in more detail. Note that, the exhaust VVT mechanism 3000 may have the same structure as the intake VVT mechanism 2000 described below.

Figure 6:
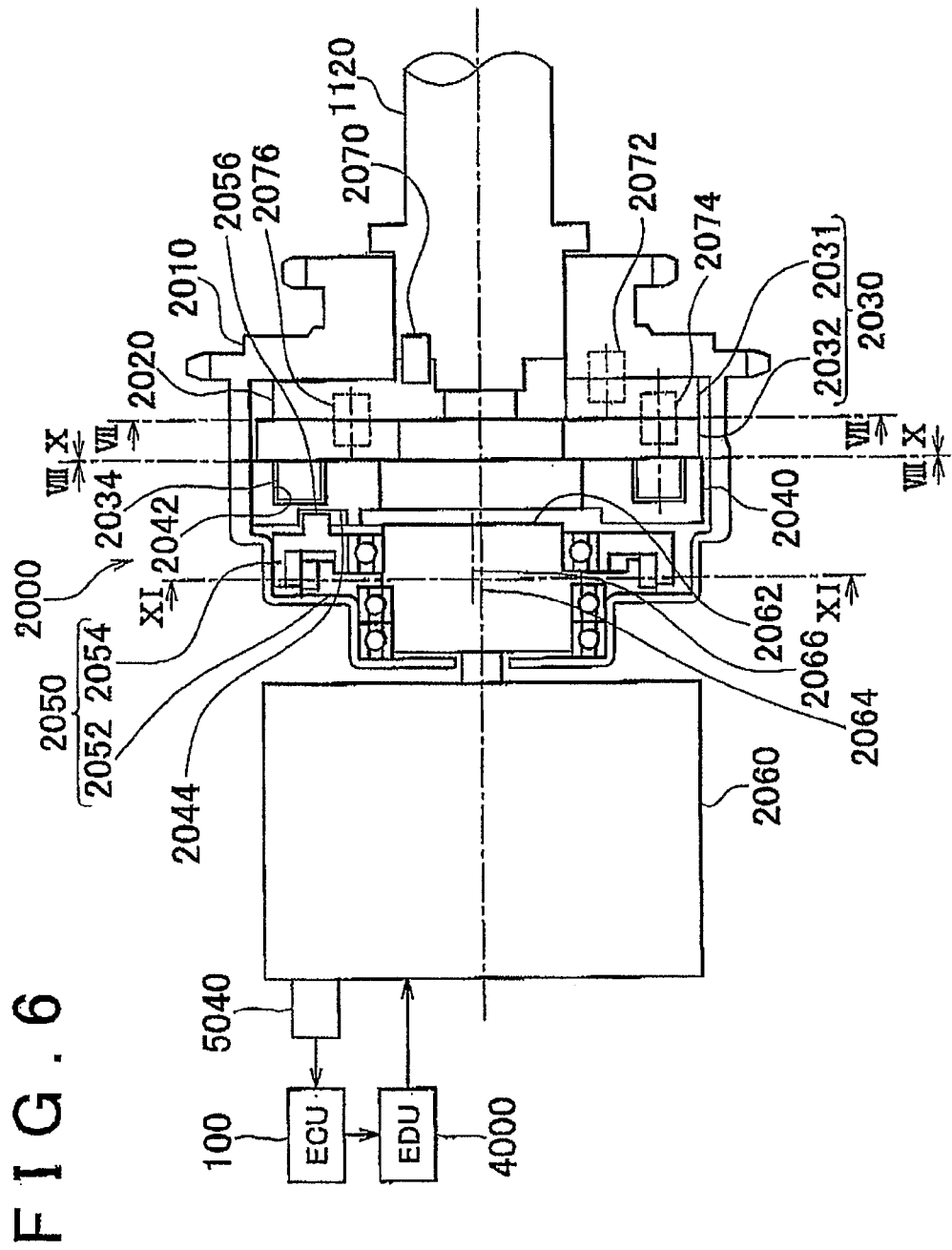
FIG. 6 is a cross-sectional view showing an intake VVT mechanism.

As shown in FIG. 6, the intake VVT mechanism 2000 includes a sprocket 2010, a cam plate 2020, link mechanisms 2030, a guide plate 2040, a speed reducer 2050, and the electric motor 2060.

The sprocket 2010 is connected to the crankshaft 1090 via, for example, a chain. The rotational speed of the sprocket 2010 is one-half the rotational speed of the crankshaft 1090. The intake camshaft 1120 is provided in such a manner that the intake camshaft 1120 is coaxial with the rotational axis of the sprocket 2010 and rotates relative to the sprocket 2010.

The cam plate 2020 is connected to the intake camshaft 1120 with a first pin 2070. In the sprocket 2010, the cam plate 2020 rotates together with the intake camshaft 1120. The cam plate 2020 and the intake camshaft 1120 may be formed integrally with each other.

Figure 7:
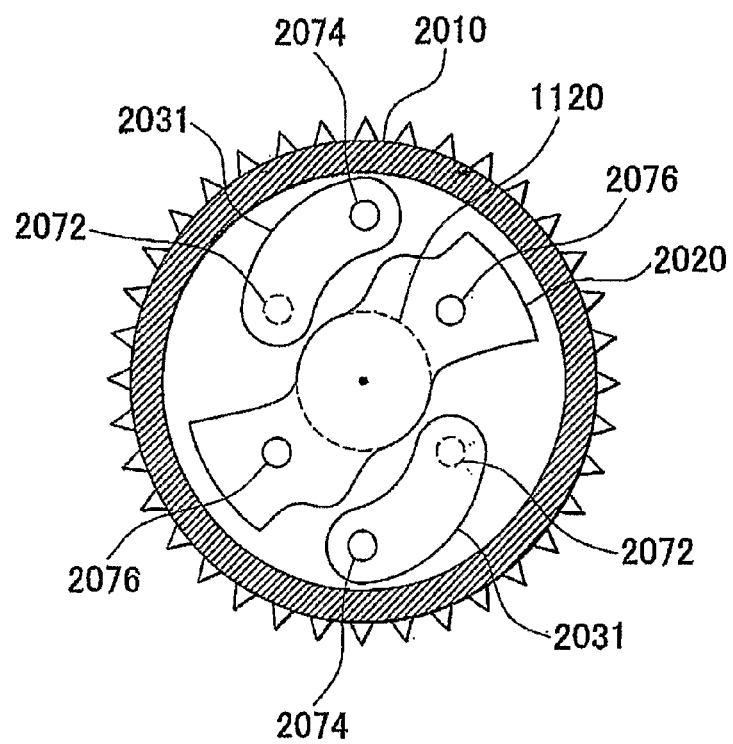
FIG. 7 is a cross-sectional view taken along the line VII-VII in FIG. 6.

Each link mechanism 2030 is formed of a first arm 2031 and a second arm 2032. As shown in FIG. 7, that is, a cross-sectional view taken along the line VII-VII in FIG. 6, paired first arms 2031 are arranged in the sprocket 2010 so as to be symmetric with respect to the rotational axis of the intake camshaft 1120. Each first arm 2031 is connected to the sprocket 2010 so as to pivot about a second pin 2072.

Figure 8:
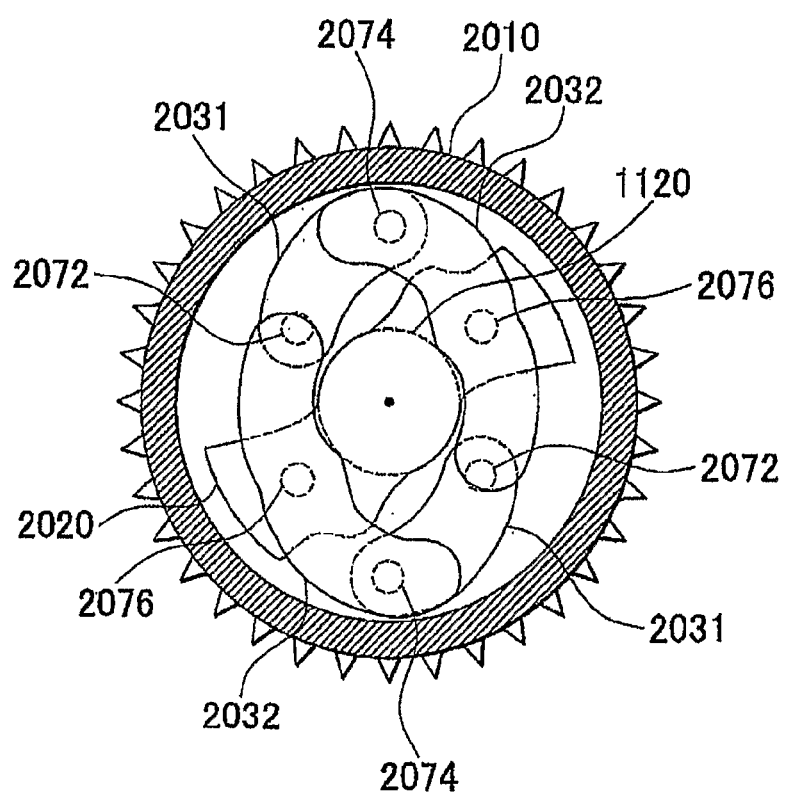
FIG. 8 is a first cross-sectional view taken along the line VIII-VIII in FIG. 6.
Figure 9:
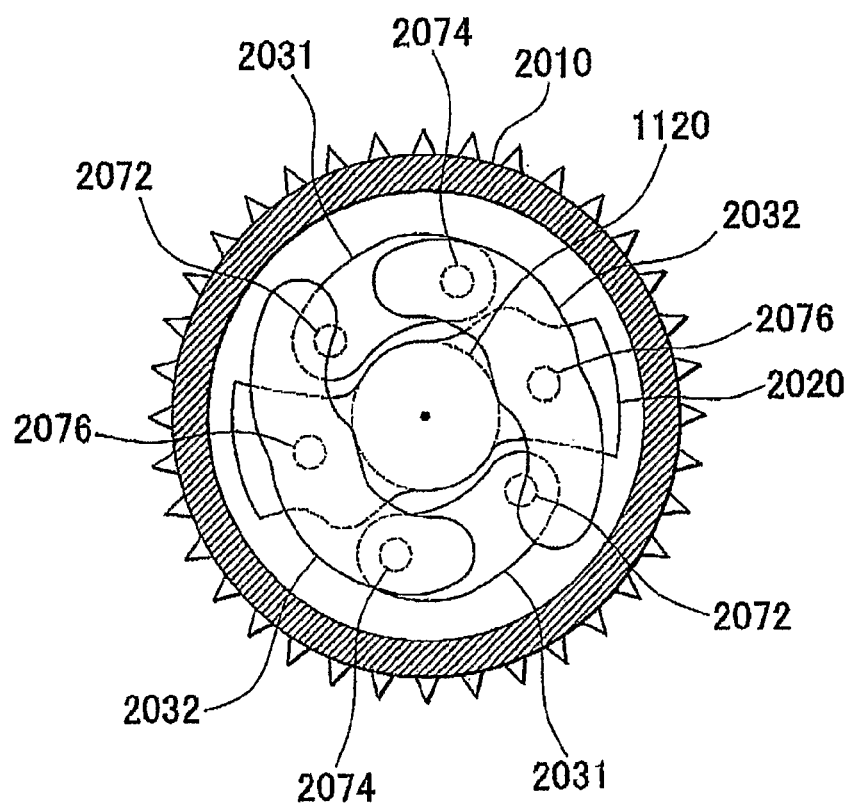
FIG. 9 is a second cross-sectional view taken along the line VIII-VIII in FIG. 6.

As shown in FIG. 8, that is, a cross-sectional view taken along the line VIII-VIII in FIG. 6, and FIG. 9 that shows the state achieved by advancing the phase of the intake valve 1100 from the state shown in FIG. 8, the first arms 2031 and the cam plate 2020 are connected to each other by the second arms 2032.

Each second arm 2032 is supported so as to pivot about a third pin 2074, with respect to the first arm 2031. Each second arm 2032 is supported so as to pivot about a fourth pin 2076, with respect to the cam plate 2020.

The intake camshaft 1120 is rotated relative to the sprocket 2010 by the pair of link mechanisms 2030, whereby the phase of the intake valve 1100 is changed. Accordingly, even if one of the link mechanisms 2030 breaks and snaps, the phase of the intake valve 1100 is changed by the other link mechanism 2030.

Referring again to FIG. 6, a control pin 2034 is fitted on one face of each link mechanism 2030 (more specifically, the second arm 2032), the face being proximal to the guide plate 2040. The control pin 2034 is arranged coaxially with the third pin 2074. Each control pin 2034 slides within a guide groove 2042 formed in the guide plate 2040.

Each control pin 2034 moves in the radial direction while sliding within the guide groove 2042 formed in the guide plate 2040. The movement of each control pin 2034 in the radial direction rotates the intake camshaft 1120 relative to the sprocket 2010.

Figure 10:
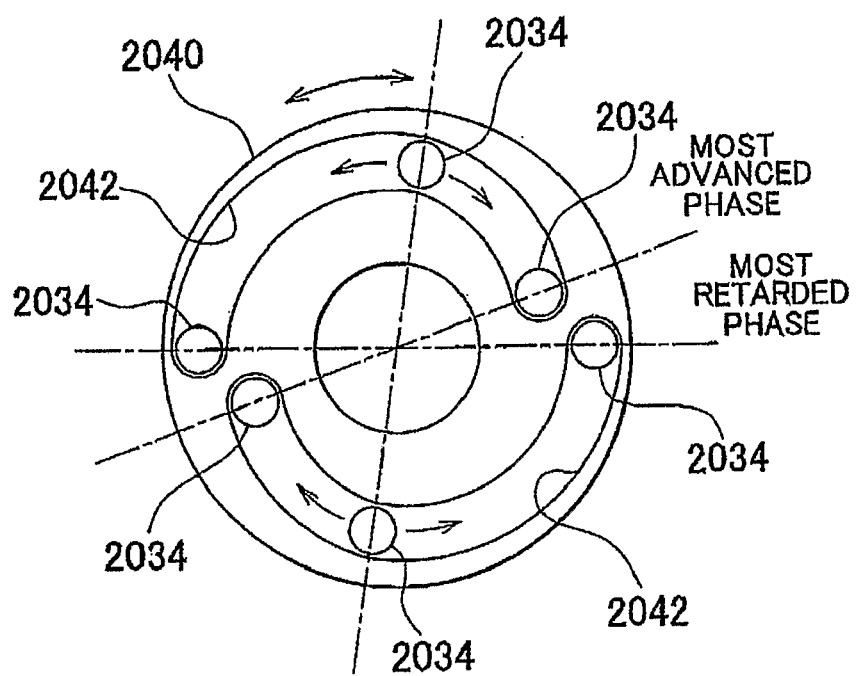
FIG. 10 is a cross-sectional view taken along the line X-X in FIG. 6.

As shown in FIG. 10, that is, a cross-sectional view taken along the line X-X in FIG. 6, the guide groove 2042 is formed in a spiral fashion so that the control pin 2034 moves in the radial direction in accordance with the rotation of the guide plate 2040. However, the shape of the guide groove 2042 is not limited to this.

As the distance between the control pin 2034 and the axis of the guide plate 2040 increases in the radial direction, the phase of the intake valve 1100 is more retarded. Namely, the amount of change in the phase corresponds to the amount by which each link mechanism 2030 is operated in accordance with the movement of the control pin 2034 in the radial direction. Note that, as the distance between the control pin 2034 and the axis of the guide plate 2040 increases in the radial direction, the phase of the intake valve 1100 may be more advanced.

As shown in FIG. 10, when the control pin 2034 reaches the end of the guide groove 2042, the operation of the link mechanism 2030 is restricted. Accordingly, the phase, at which the control pin 2034 reaches the end of the guide groove 2042, is the mechanically determined most advanced phase or the mechanically determined most retarded phase of the intake valve 1100.

Referring again to FIG. 6, multiple recesses 2044 are formed in one face of the guide plate 2040, the face being proximal to the speed reducer 2050. The recesses 2044 are used to connect the guide plate 2040 and the speed reducer 2050 to each other.

The speed reducer 2050 is formed of an external gear 2052 and an internal gear 2054. The external gear 2052 is fixed to the sprocket 2010 so as to rotate together with the sprocket 2010.

Multiple projections 2056, which are fitted in the recesses 2044 of the guide plate 2040, are formed on the internal gear 2054. The internal gear 2054 is supported so as to be rotatable about an eccentric axis 2066 of a coupling 2062 of which the axis deviates from an axis 2064 of the output shaft of the electric motor 2060.

Figure 11:
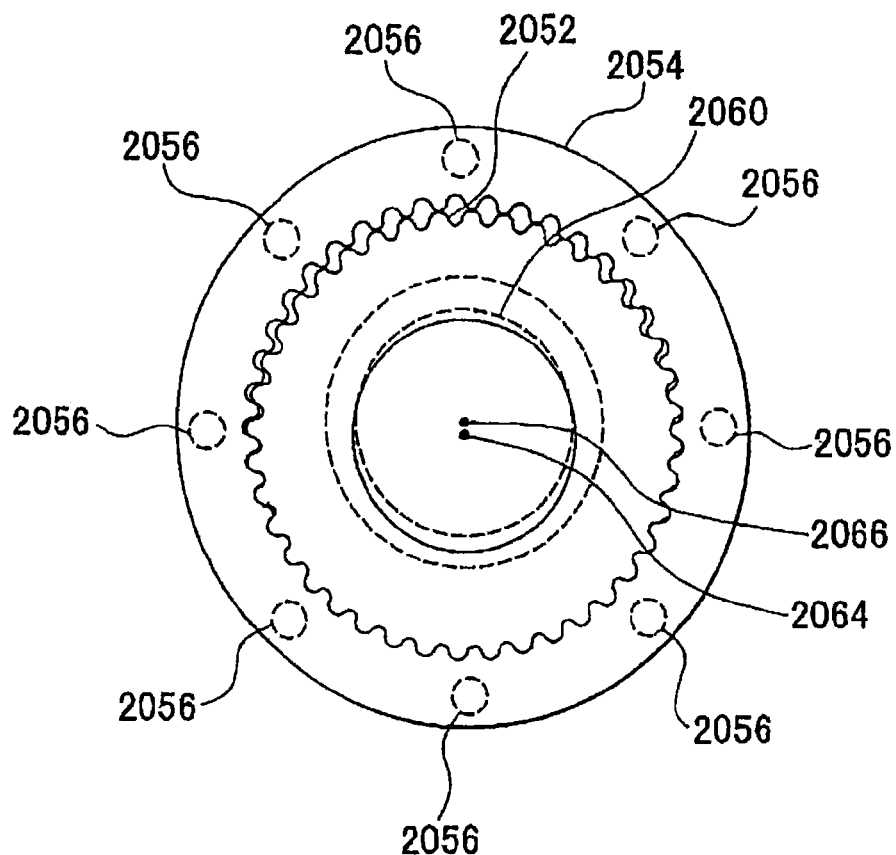
FIG. 11 is a cross-sectional view taken along the line XI-XI in FIG. 6.

FIG. 11 shows a cross-sectional view taken along the line XI-XI in FIG. 6. The internal gear 2054 is arranged in such a manner that part of the multiple teeth thereof mesh with the external gear 2052. When the rotational speed of the output shaft of the electric motor 2060 is equal to the rotational speed of the sprocket 2010, the coupling 2062 and the internal gear 2054 rotate at the same rotational speed as the external gear 2052 (the sprocket 2010). In this case, the guide plate 2040 rotates at the same rotational speed as the sprocket 2010, and the phase of the intake valve 1100 is maintained.

When the coupling 2062 is rotated about the axis 2064 relative to the external gear 2052 by the electric motor 2060, the entirety of the internal gear 2054 turns around the axis 2064, and, at the same time, the internal gear 2054 rotates about the eccentric axis 2066. The rotational movement of the internal gear 2054 causes the guide plate 2040 to rotate relative to the sprocket 2010, whereby the phase of the intake valve 1100 is changed.

The phase of the intake valve 1100 is changed by reducing the relative rotational speed (the operation amount of the electric motor 2060) between the output shaft of the electric motor 2060 and the sprocket 2010. using the speed reducer 2050, the guide plate 2040 and the link mechanisms 2030. Alternatively, the phase of the intake valve 1100 may be changed by increasing the relative rotational speed between the output shaft of the electric motor 2060 and the sprocket 2010.

As described above, with the VVT mechanism 2000 according to the embodiment of the invention, the phase of the intake valve 1100 is changed using the rotational speed of the electric motor 2060 relative to the rotational speed of the sprocket 2010, that is, the difference between the rotational speed of the electric motor 2060 and the rotational speed of the sprocket 2010 (basically, the same as the rotational speed of the intake camshaft 1120) as the operation amount of the actuator.

Figure 12:
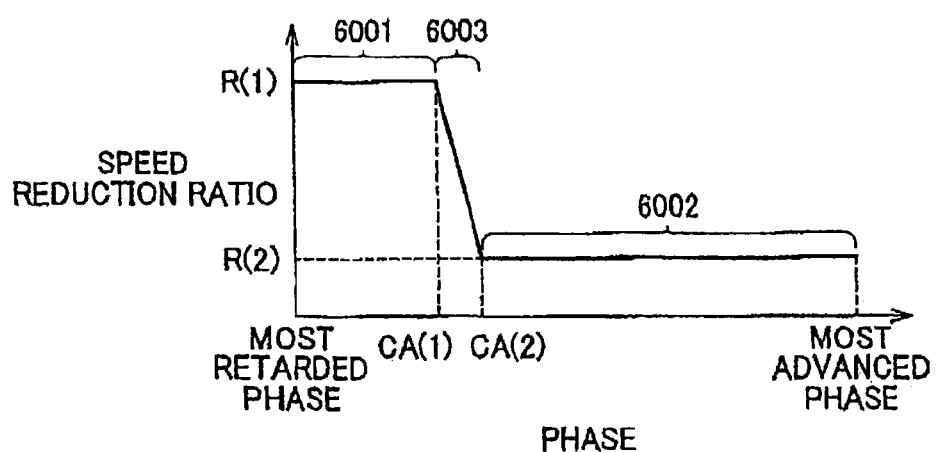
FIG. 12 is a graph showing the speed reduction ratio that elements of the intake VVT mechanism realize in cooperation.

As shown in FIG. 12, the speed reduction ratio that the elements of the intake VVT mechanism 2000 realize in cooperation, namely, the ratio of the relative rotational speed between the output shaft of the electric motor 2060 and the sprocket 2010 to the amount of change in the phase of the intake valve 1100, may take a value corresponding to the phase of the intake valve 1100. According to the embodiment of the invention, as the speed reduction ratio increases, the amount of change in the phase with respect to the relative rotational speed between the output shaft of the electric motor 2060 and the sprocket 2010 decreases.

When the phase of the intake valve 1100 is within a retardation region 6001 that extends from the most retarded phase to CA1, the speed reduction ratio that the elements of the intake VVT mechanism 2000 realize in cooperation is R1. When the phase of the intake valve 1100 is within an advance region 6002 that extends from CA2 (CA2 is the phase that is more advanced than CA1) to the most advanced phase, the speed reduction ratio that the elements of the intake VVT mechanism 2000 realize in cooperation is R2 (R1>R2), When the phase of the intake valve 1100 is within an intermediate region 6003 that extends from CA1 to CA2, the speed reduction ratio that the elements of the intake VVT mechanism 2000 realize in cooperation changes at a predetermined rate ((R2−R1)/(CA2−CA1)).

The effects of the intake VVT mechanism 2000 of the variable valve timing mechanism will be described below.

Figure 13:
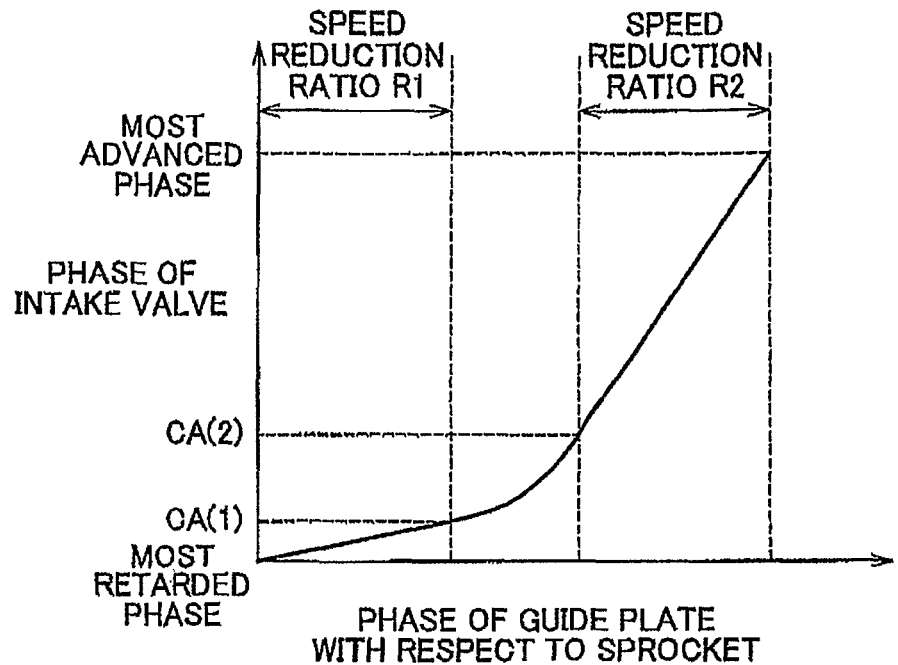
FIG. 13 is a graph showing the relationship between the phase of a guide plate relative to a sprocket and the phase of the intake valve.

When the phase of the intake valve 1100 (the intake camshaft 1120) is advanced, the electric motor 2060 is operated to rotate the guide plate 2040 relative to the sprocket 2010. As a result, the phase of the intake valve 1100 is advanced, as shown in FIG. 13.

When the phase of the intake valve 1100 is within the retardation region 6001 that extends from the most retarded phase to CA1, the relative rotational speed between the output shaft of the electric motor 2060 and the sprocket 2010 is reduced at the speed reduction ratio R1. As a result, the phase of the intake valve 1100 is advanced.

When the phase of the intake valve 1100 is within the advance region 6002 that extends from CA2 to the most advanced phase, the relative rotational speed between the output shaft of the electric motor 2060 and the sprocket 2010 is reduced at the speed reduction ratio R2. As a result, the phase of the intake valve 1100 is advanced.

When the phase of the intake valve 1100 is retarded, the output shaft of the electric motor 2060 is rotated relative to the sprocket 2010 in the direction opposite to the direction in which the phase of the intake valve 1100 is advanced. When the phase is retarded, the relative rotational speed between the output shaft of the electric motor 2060 and the sprocket 2010 is reduced in the manner similar to that when the phase is advanced. When the phase of the intake valve 1100 is within the retardation region 6001 that extends from the most retarded phase to CA1, the relative rotational speed between the output shaft of the electric motor 2060 and the sprocket 2010 is reduced at the speed reduction ratio R1.

As a result, the phase is retarded. When the phase of the intake valve 1100 is within the advance region 6002 that extends from CA2 to the most advanced phase, the relative rotational speed between the output shaft of the electric motor 2060 and the sprocket 2010 is reduced at the speed reduction ratio R2. As a result, the phase is retarded.

Accordingly, as long as the direction of the relative rotation between the output shaft of the electric motor 2060 and the sprocket 2010 remains unchanged, the phase of the intake valve 1100 may be advanced or retarded in both the retardation region 6001 that extends from the most retarded phase to CA1 and the advance region 6002 that extends from the CA2 to the most advanced phase. In this case, in the advance region 6002 that extends from CA2 to the most advanced phase, the phase is advanced or retarded by an amount larger than that in the retardation region 6001 that extends from the most retarded phase to CA1. Accordingly, the advance region 6002 is broader in the phase change width than the retardation region 6001.

In the retardation region 6001 that extends from the most retarded phase to CA1, the speed reduction ratio is high. Accordingly, a high torque is required to rotate the output shaft of the electric motor 2060 using the torque applied to the intake camshaft 1120 in accordance with the operation of the engine 1000. Therefore, even when the electric motor 2060 does not produce a torque, for example, even when the electric motor 2060 is stopped, the rotation of the output shaft of the electric motor 2060, which is caused by the torque applied to the intake camshaft 1120, is restricted. This restricts the deviation of the actual phase from the phase used in the control.

Therefore, if the intake valve phase when the engine stops is within the retardation region 6001 in which the speed reduction is high, even when the output shaft of the electric motor 2060 is rotated by a reaction force generated by the intake camshaft 1120 when the engine is stopped, it is possible to prevent an unintentional change in the intake valve phase, that is, a deviation of the actual phase from the phase used in the control. Conversely, in order to prevent such a change in the intake valve phase, it is necessary to reliably place the intake valve phase when the engine stops into the retardation region 6001 in which the speed reduction ratio is high.

Generally, in a hybrid vehicle, the frequency with which the engine is started while the vehicle is traveling is high because the engine 1000 may be operated intermittently while the vehicle is traveling. Therefore, the valve phase when the engine is started, namely, the target phase that is used when the engine is stopped, is set to the most retarded phase in order to execute a start-time pressure-reducing control (so-called decompression control) for reducing shock that is likely to be caused when the engine is being started. Therefore, it is preferable to set the speed reduction ratio that is used in the retardation region 6001 to a high value.

When the phase of the intake valve 1100 is within the intermediate region 6003 that extends from CA1 to CA2, the relative rotational speed between the output shaft of the electric motor 2060 and the sprocket 2010 is reduced at the speed reduction ratio than changes at a predetermined rate. As a result, the phase of the intake valve 1100 is advanced or retarded.

When the phase of the intake valve 1100 is shifted from the retardation region to the advance region, or from the advance region to the retardation region, the amount of change in the phase with respect to the relative rotational speed between the output shaft of the electric motor 2060 and the sprocket 2010 is gradually increased or reduced. Accordingly, an abrupt stepwise change in the amount of change in the phase is restricted to restrict an abrupt change in the phase. As a result, the phase of the intake valve 1100 is controlled more appropriately.

Figure 14:
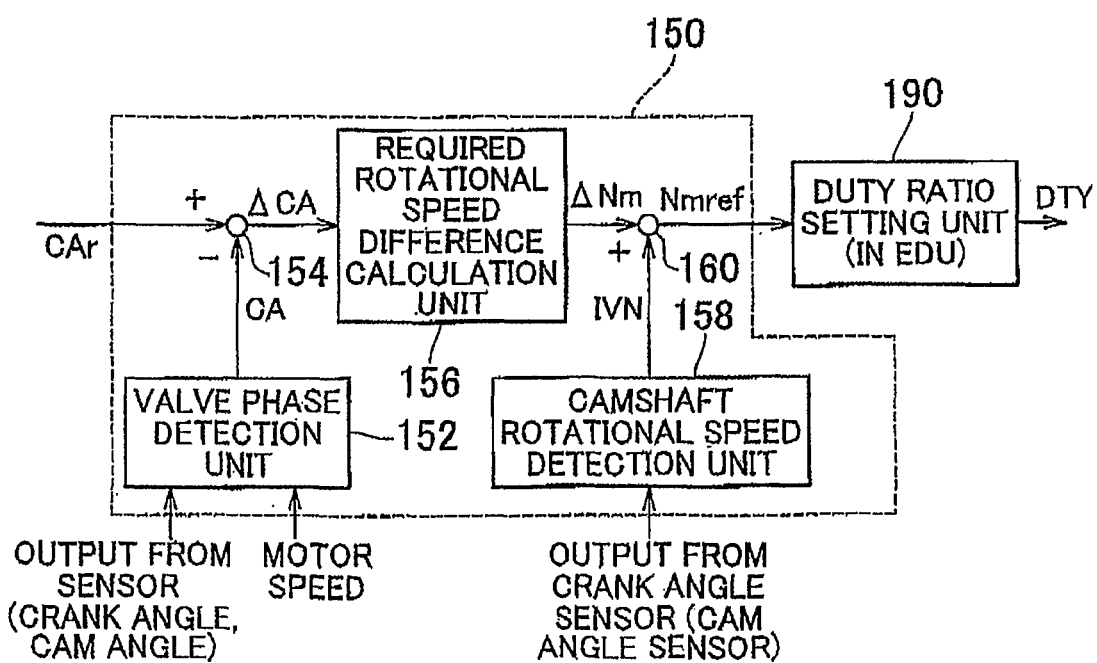
FIG. 14 is a block diagram illustrating the configuration of a control executed over a variable valve timing mechanism according to the embodiment of the invention.

FIG. 14 is a block diagram illustrating the configuration of a control executed over the variable valve timing mechanism according to the embodiment of the invention. Each block shown in FIG. 14 is implemented by the ECU 100 using either hardware or software.

As shown in FIG. 14, a valve phase control unit 150 sets a rotational speed command value Nmref for the electric motor 2060, which serves as an actuator, based on a deviation ΔCA of an actual valve phase CA from a target phase CAr for the intake valve 1100.

The valve phase control unit 150 includes a valve phase detection unit 152, calculation units 154 and 160, a required rotational speed difference calculation unit 156, and a camshaft rotational speed detection unit 158.

The valve phase detection unit 152 calculates the current valve phase CA of the intake valve 1100 based on signals from the crank angle sensor 5000 and the cam position sensor 5010 (crank angle signal and cam angle signal) or the motor speed detected by the rotational speed sensor 5040 for the electric motor 2060.

The valve phase detection unit 152 detects the current valve phase CA based on the crank angle signal and the cam angle signal from the sensors described above by, for example, converting a time lag between issuance of the cam angle signal and issuance of the crank angle signal into the rotational phase difference between the crankshaft 1090 and the intake camshaft 1120.

Alternatively, with the intake VVT mechanism 2000 according to the embodiment of the invention, a valve phase change amount Δθ within a time ΔT can be traced based on the operation amount (rotational speed difference ΔNm) of the electric motor 2060, which serves as an actuator, according to Equation 1. In Equation 1, R(θ) denotes the speed reduction ratio, shown in FIG. 12, which changes in accordance with the intake valve phase.

$$\Delta\theta \propto \Delta Nm \times 360° \times (1/R(\theta)) \times \Delta T \qquad (1)$$

Therefore, the valve phase detection unit 152 is able to detect the current valve phase CA by integrating the phase change amounts Δθ calculated according to Equation 1.

The calculation unit 154 calculates the phase deviation ΔCA of the current valve phase CA detected by the valve phase detection unit 152 from the target phase CAr.

The required rotational speed difference calculation unit 156 calculates the rotational speed difference ΔNm between the rotational speed of the output shaft of the electric motor 2060 and the rotational speed of the sprocket 2010 (intake camshaft 1120), which is used to make the actual valve phase closer to the target phase CAr, based on the phase deviation ΔCA calculated by the calculation unit 154. For example, the rotational speed difference ΔNm is set to a positive value (ΔNm>0) when the intake valve phase is advanced, whereas it is set to a negative value (ΔNm<0) when the intake valve phase is retarded. When the current intake valve phase is maintained (namely when Δθ=0), the rotational speed difference ΔNm is set to a value substantially equal to zero (ΔNm=0).

The camshaft rotational speed detection unit 158 calculates the rotational speed of the sprocket 2010, that is, an actual rotational speed IVN of the intake camshaft 1120 by dividing the rotational speed of the crankshaft 1090 by two.

The calculation unit 160 calculates the rotational speed command value Nmref for the electric motor 2060 by adding the actual rotational speed IVN of the intake camshaft 1120, which is detected by the camshaft rotational speed detection unit 158, and the rotational speed difference ΔNm, which is set by the required rotational speed difference calculation unit 156, together. A signal indicating the rotational speed command value Nmref is transmitted to an LOU 4000.

The EDU 4000 executes a rotational speed control for operating the electric motor 2060 according to the rotational speed command value Nmref. For example, the EDU 4000 includes a duty ratio setting unit 190 that sets a duty ratio DTY based on the rotational speed command value Nmref. The duty ratio setting unit 190 receives a signal indicating a rotational speed Nmt of the electric motor 2060 that is detected by the rotational speed sensor 5040. The duty ratio setting unit 190 controls the duty ratio DTY based on the motor speed Nmt and the rotational speed command value Nmref so that the motor speed Nmt matches the rotational speed command value Nmref.

The duty ratio DTY indicates the ratio of the duration in which a switching element (not shown) of the EDU 4000 is on to a switching cycle. The electric power that is supplied to the electric motor 2060 is controlled by operating the switching element based on the duty ratio DTY. For example, if the operating voltage of the electric motor 2060 is set to a voltage that corresponds to the duty ratio DTY, the operating voltage increases and the torque that is generated by the electric motor 2060 increases as the duty ratio DTY is set to a higher value. In other words, the operating voltage of the electric motor 2060 decreases and the torque that is generated by the electric motor 2060 deceases as the duty ratio is set to a lower value.

Instead of setting the duty ratio DTY, the operating voltage or the operating current of the electric motor 2060 may be directly set by the EDU 4000 based on the motor speed Nmt and the rotational speed command value Nmref. In this case, the rotational speed control may be executed by driving the electric motor 2060 at the set operating voltage or with the set operating current.

VVT control executed during engine stop process

Next, a control that is executed over the VVT mechanism 2000 during a stop process of the engine 1000 will be described.

Figure 15:
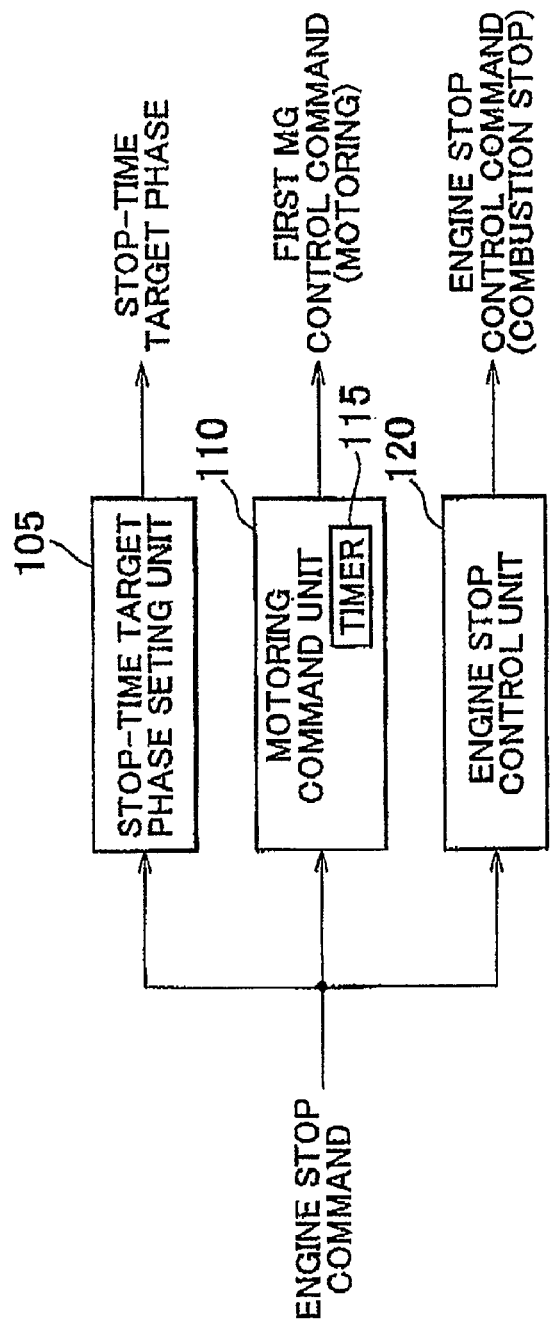
FIG. 15 is a block diagram illustrating a first example of control that is executed over the variable valve timing mechanism during an engine stop process according to the embodiment of the invention.

FIG. 15 is a block diagram illustrating a first example of control that is executed over the variable valve timing mechanism during an engine stop process according to the embodiment of the invention.

As shown in FIG. 15, a stop-time target phase setting unit 105 sets the target phase CAr for the intake valve 1100 to a stop-time target phase, which is used when the engine is stopped, in response to issuance of an engine stop command. The stop-time target phase is a valve phase that is suitable for next engine starting. As described above, in a hybrid vehicle, it is preferable to set the stop-time target phase to the phase suitable for the start-time pressure-reducing control (so-called decompression control) for reducing shock that is likely to occur when the engine starts. This valve phase corresponds to the most retarded phase in FIG. 12.

An engine stop control unit 120 generates, a series of control commands for the engine stop process in response to issuance of an engine stop command. Fuel combustion in the engine 1000 is stopped according to these control commands, whereby the engine 1000 is stopped.

The VVT mechanism 2000 is configured so as not to change the valve phase using the electric motor 2060 after the engine 1000 stops. Therefore, it is necessary to change the valve phase by a sufficient amount during the engine stop process so that the valve phase reaches the stop-time target phase (e.g. most retarded phase) within a period from when an engine stop command is issued until when rotation of the engine 1000 stops.

Therefore, a motoring command unit 110 generates an MG1 control command for rotating the engine 1000 using the first MG 200 (hereinafter, referred to as "motoring" where appropriate) for a predetermined period Tm (e.g. Tm=approximately 0.5 seconds to approximately 1 second) that is counted by a timer 115 in response to issuance of an engine stop command. The control command is generated to control the torque output from the first MG 200 so that the rotational speed of the engine 1000 which is achieved when it is rotated by the first MG 200 (hereinafter, referred to as "motoring engine speed" where appropriate) matches the regular target rotational speed that is used when the engine 1000 is idling. Thus, it is possible to avoid the situation in which the driver feels a sense of significant discomfort, by controlling the motoring engine speed to a value substantially equal to the regular target idle speed.

Figure 16:
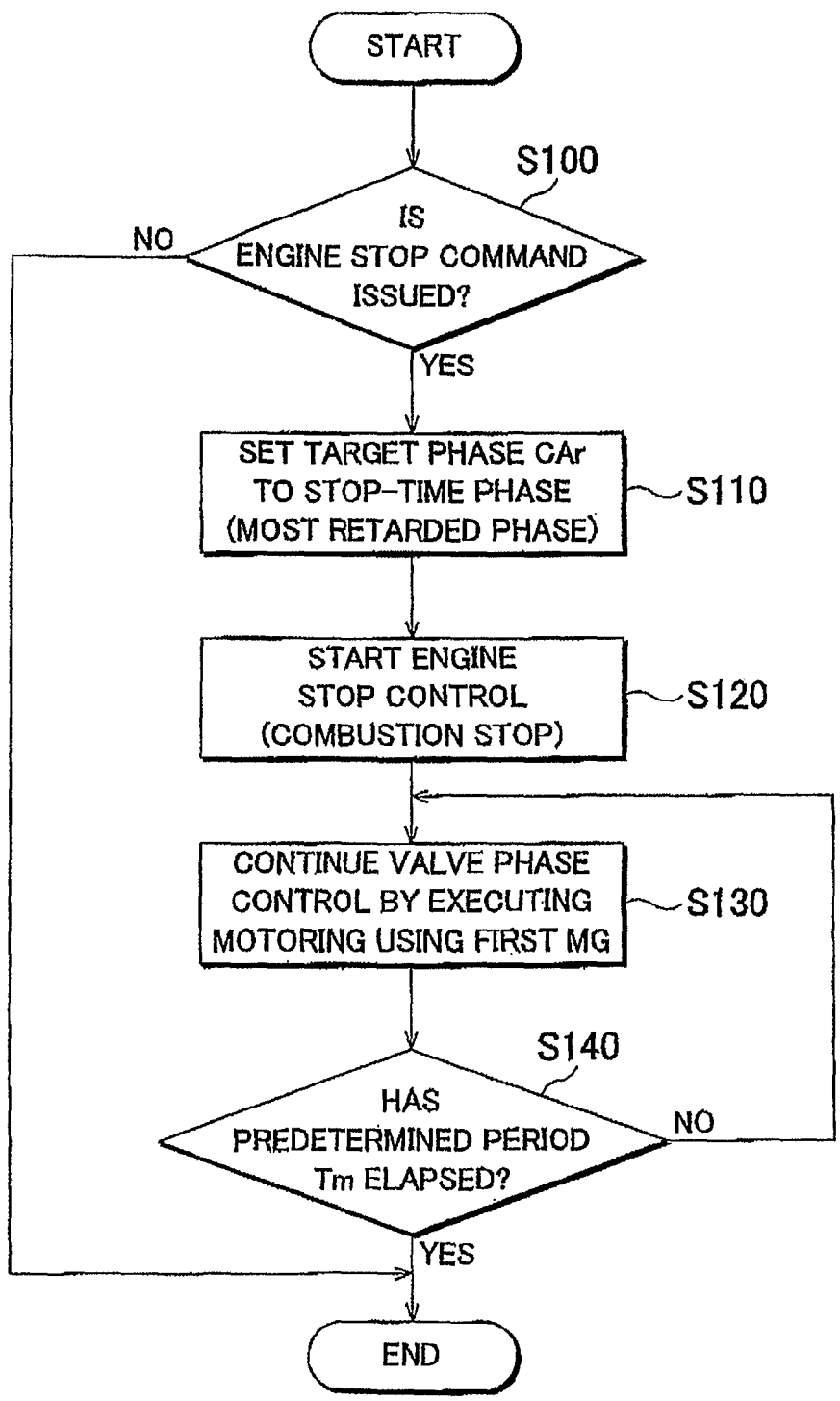
FIG. 16 is a flowchart for executing the first example of control shown in FIG. 15 by executing a software process using the ECU.

FIG. 16 is a flowchart for executing the first example of control shown in FIG. 15 by executing a software process using the ECU.

As shown in FIG. 16, the ECU 100 determines, in step (hereinafter, referred to as "S") 100, whether an engine stop command is issued. If it is determined that an engine stop command is issued ("YES" in S100), the ECU 100 executes the following steps.

If it is determined that an engine stop Command is issued, the ECU 100 sets, in S110, the target phase CAr to the target phase that is used when the engine is stopped (most retarded phase in the embodiment of the invention), and starts the engine stop control by stopping the combustion in S120. That is, the process in S110 corresponds to the function of the stop-time target phase setting unit 105 in FIG. 15, and the process in S120 corresponds to the function of the motoring command unit 110 in FIG. 15.

In S130, the ECU 100 generates a first MG control command for rotating the engine 1000 using the first MG 200 (executing motoring). In S140, the ECU 100 checks the time that has elapsed since the engine stop command is issued, and continues motoring using the first MG 200 until the predetermined period Tm has elapsed since the engine stop command is issued (when a negative determination is made in S140). That is, the processes in S130 and S140 correspond to the function of the motoring command unit 110 in FIG. 15.

Thus, even if the combustion is stopped, the engine 1000 is rotated at idle due to execution of motoring. Therefore, the VVT mechanism 2000 can change the valve phase toward the target phase CAr using the output from the electric motor 2060 during the predetermined period Tm.

Therefore, with the variable valve timing mechanism according to the embodiment of the invention, it is possible to more reliably bring the valve phase when the engine stops to the target phase that is suitable for next engine starting by increasing the amount by which the valve phase can be changed after issuance of an engine stop command. As a result, it is possible to ensure good engine startability.

Figure 17:
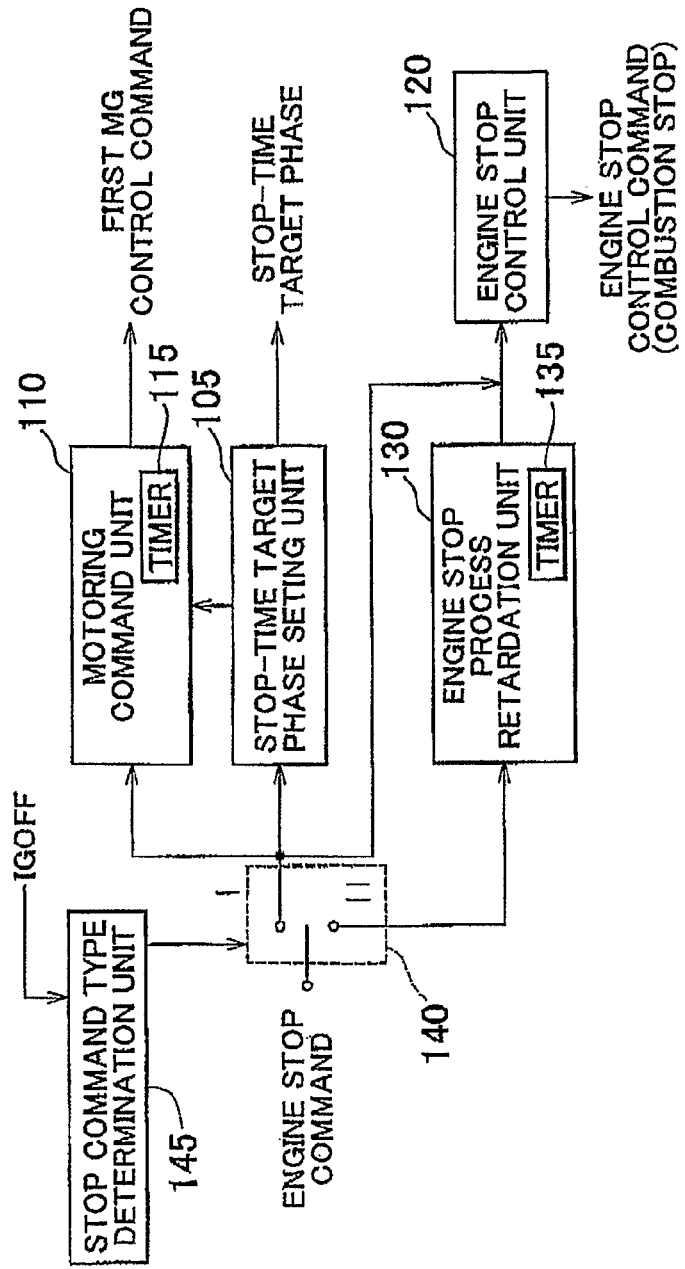
FIG. 17 is a block diagram illustrating a second example of control that is executed over the variable valve timing mechanism during the engine stop process according to the embodiment of the invention.

FIG. 17 is a block diagram illustrating a second example of control that is executed over the variable valve timing mechanism during the engine stop process according to the embodiment of the invention.

As described above, in a hybrid vehicle, the engine 1000 may be automatically stopped while the vehicle is traveling, for example, when the cruise mode in which the vehicle travels using only the drive power generated by the second MG 400 is selected. That is, examples of engine stop command in a hybrid vehicle include a manually-issued engine stop command that is issued based on an intention of the driver, that is, issued in response to an operation performed by the driver (e.g. operation for turning off a switch, for example, an ignition switch), and an automatically-issued engine stop command that is issued in response to satisfaction of the predetermined vehicle cruise condition as described above. Accordingly, in the following description concerning the second example of control, the control, which is executed over the variable valve timing mechanism during the engine stop process based on a type of the engine stop command, will be described.

As shown in FIG. 17, in the second example of control, in addition to the units in the first example of control shown in FIG. 15, an engine stop process retardation unit 130, a switching unit 140 and a stop command type determination unit 145 are further provided.

The stop command type determination unit 145 determines whether the issued engine stop command is a manually-issued stop command that is issued in response to an operation performed by the driver or an automatically-issued stop command that is issued based on the vehicle cruise state. For example, an engine stop command that is issued in the state in which an IG OFF signal is generated is determined to be a manually-issued stop command, and an engine stop command that is issued in the other states is determined to be an automatically-issued stop command, whereby the stop command type determination unit 145 is implemented.

When the stop command type determination unit 145 determines that the engine stop command is a manually-issued stop command, the switching unit 140 selects the I mode. Thus, the engine stop command is transmitted to the motoring command unit 110, and is also transmitted to the engine stop control unit 120 without passing through the engine stop process retardation unit 130. As a result, the control over the variable valve timing mechanism during the engine stop process is executed by the motoring command unit 110 and the engine stop control unit 120, in the manner similar to that illustrated in FIGS. 15 and 16. Thus, the amount by which the valve phase can be changed after issuance of the engine stop command is increased based on the period in which motoring is executed.

In contrast, when the stop command type determination unit 145 determines that the engine stop command is an automatically-issued stop command, the switching unit 140 selects the II mode. In this case, because the engine stop command is not transmitted to the motoring command unit 110, motoring is not executed when the engine is stopped. The engine stop command is transmitted to the engine stop control unit 120 via the engine stop process retardation unit 130. The engine stop process retardation unit 130 transmits the engine stop command to the engine stop control unit 120 after a retardation of a predetermined period Te (e.g. Te=approximately 0.5 seconds to approximately 1 second) that is counted by a timer 135. As a result, the engine stop control unit 120 starts the engine stop control by stopping the combustion after the predetermined period Te has elapsed since the automatically-issued engine stop command is actually issued. Thus, the amount by which the valve phase can be changed using the output from the electric motor 2060 is increased based on the amount by which start of the engine 1000 stop process is retarded. Thus, it is possible to more reliably bring the valve phase when the engine stops to the target phase that is suitable for next engine starting.

Figure 18:
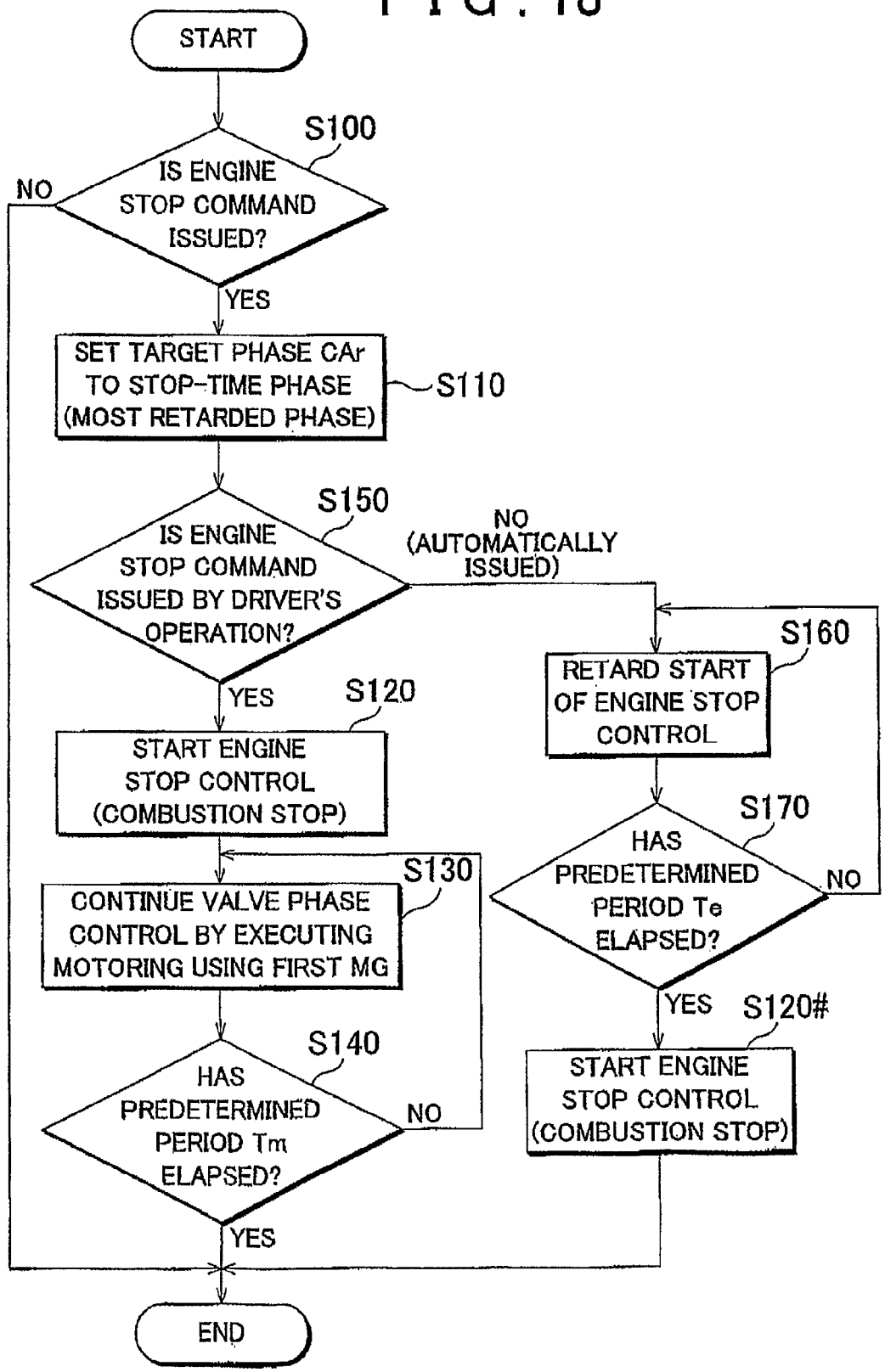
FIG. 18 is a flowchart for executing the second example of control shown in FIG. 17 by executing a software process using the ECU.

FIG. 18 is a flowchart for executing the second example of control shown in FIG. 17 by executing a software process using the ECU.

As shown in FIG. 18, after executing S100 and S110 which are the same as those in FIG. 16, the ECU 100 determines, in S150, whether the engine stop command is issued in response to an operation performed by the driver. In S150, the process, which is the same as the process executed by the stop command type determination unit 145 in FIG. 17, is executed. If it is determined that the engine stop command is issued in response to an operation performed by the driver ("YES" in S150), the ECU 100 executes S120 to S140. Thus, the engine stop process is started without retarding execution of the engine stop command issued in response to the operation performed by the driver, and the amount by which the valve phase can be changed after issuance of the engine stop command is increased by executing motoring using the first MG 200.

On the other hand, if it is determined that the engine stop command is issued not in response to an operation performed by the driver but automatically ("YES" in S150), the ECU 100 retards start of the engine stop process until the predetermined period Te has elapsed since issuance of the engine stop command, by executing S160 and S170. That is, the processes in S160 and S170 correspond to the function of the engine stop process retardation unit 130 shown in FIG. 17.

After the predetermined period Te has elapsed since issuance of the engine stop command ("YES" in S170), the ECU 100 executes S120#, which is the same as S120, to start the engine stop control by stopping the combustion. As a result, when the engine is automatically stopped while the vehicle is driven, the period in which the engine operates is increased by retarding a start of the engine stop process without executing motoring. Thus, the amount by which the valve phase can be changed after issuance of the engine stop command is increased.

If motoring is executed when the engine is stopped, the atmosphere in a combustion chamber becomes the lean atmosphere. Therefore, the exhaust emission may be influenced by, for example, an increase in NOx when the engine is started next time. Accordingly, if motoring is not executed in a case of an automatic engine stop, which may be frequently caused while the vehicle is driven, it is possible to avoid the situation in which the exhaust emission deteriorates when the engine is started next time. The automatically-issued engine stop command is not issued based on an intention of the driver. Therefore, even if the time required until the engine stops is increased by the predetermined period Te, the driver does not feel a sense of discomfort easily. Accordingly, it is possible to increase the amount by which the valve phase can be changed after issuance of the engine stop command by increasing the period from when the engine stop command is issued until when the engine stops.

Therefore, according to the second example of control shown in FIGS. 17 and 18, the amount by which the valve phase can be changed after issuance of the engine stop command is increased in an appropriate manner that is selected with a sense of discomfort felt by the driver and the exhaust emission when the engine is started next time taken into account based on whether the engine stop command is a manually-issued stop command, which is issued in response to an operation performed by the driver, or an automatically-issued stop command, which is issued based on the vehicle state. As a result, it is possible to more reliably bring the valve phase when the engine stops to the target phase that is suitable for next engine starting. Therefore, it is possible to more reliably ensure good engine startability.

Figure 19:
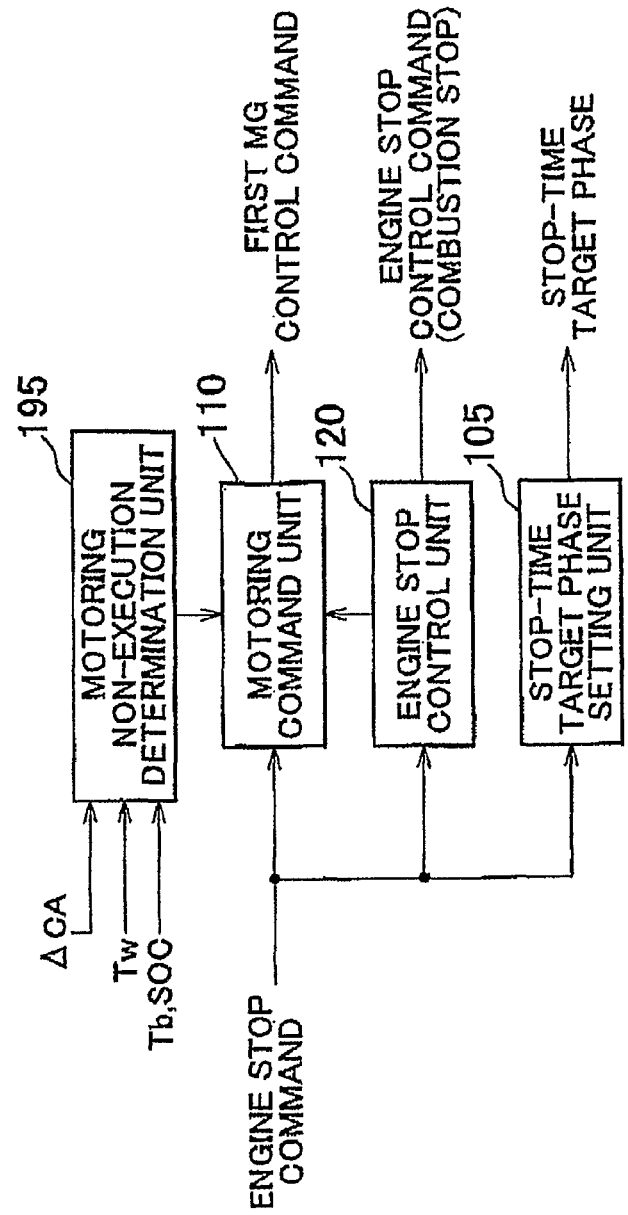
FIG. 19 is a block diagram illustrating a third example of control that is executed over the variable valve timing mechanism during the engine stop process according to the embodiment of the invention.

FIG. 19 is a block diagram illustrating a third example of control that is executed over the variable valve timing mechanism during the engine stop process according to the embodiment of the invention.

As shown in FIG. 19, in the third example of control, in addition to the units in the first example of control shown in FIG. 15, a motoring non-execution determination unit 195 is further provided.

When motoring is executed in response to issuance of an engine stop command, the motoring non-execution determination unit 195 instructs the motoring command unit 110 not to execute motoring when a predetermined condition is satisfied. For example, the motoring non-execution determination unit 195 instructs the motoring command unit 110 not to execute motoring when it is difficult for the storage unit 700 to output electric power, that is, when it is determined that the temperature of the storage unit 700 is low based on the SOC and/or when the SOC of the storage unit 700 is low based on the temperature Tb of the storage unit 700. In this way, it is possible to avoid the situation in which the storage unit 700 is damaged because it is forced to supply electric power used to execute motoring when the temperature of the storage unit 700 is low or when the SOC of the storage unit 700 is low, and therefore the storage unit 700 cannot output a sufficient amount of electric power when the engine is started next time, resulting in deterioration of engine startability.

When the engine is warm, that is, when friction at each element of the engine 1000, for example, the VVT mechanism 2000 is relatively small, it is possible to reliably ensure the amount that is required to change the valve phase to the target phase CAr during the regular required stopping period from when the engine stop command is issued until when the engine actually stops. Therefore, there is a possibility that motoring need not be executed. Accordingly, the motoring non-execution determination unit 195 may be configured so as to instruct the motoring command unit 110 not to execute motoring when the temperature of the engine (e.g. engine coolant temperature Tw detected by the coolant sensor 5020) is equal to or higher than a predetermined temperature.

Similarly, even if the deviation ΔCA of the valve phase CA from the target phase CAr is equal to or lower than a predetermined value when the engine stop command is issued, it is possible to ensure the amount that is required to change the valve phase to the target phase CAr during the regular required engine stopping period without execution of motoring. Therefore, the motoring non-execution determination unit 195 may be configured so as to instruct the motoring command unit 110 not to execute motoring when the absolute value of the deviation ΔCA of the valve phase CA from the target phase CAr when the engine stop command is issued is equal to or lower than the predetermined value.

Figure 20:
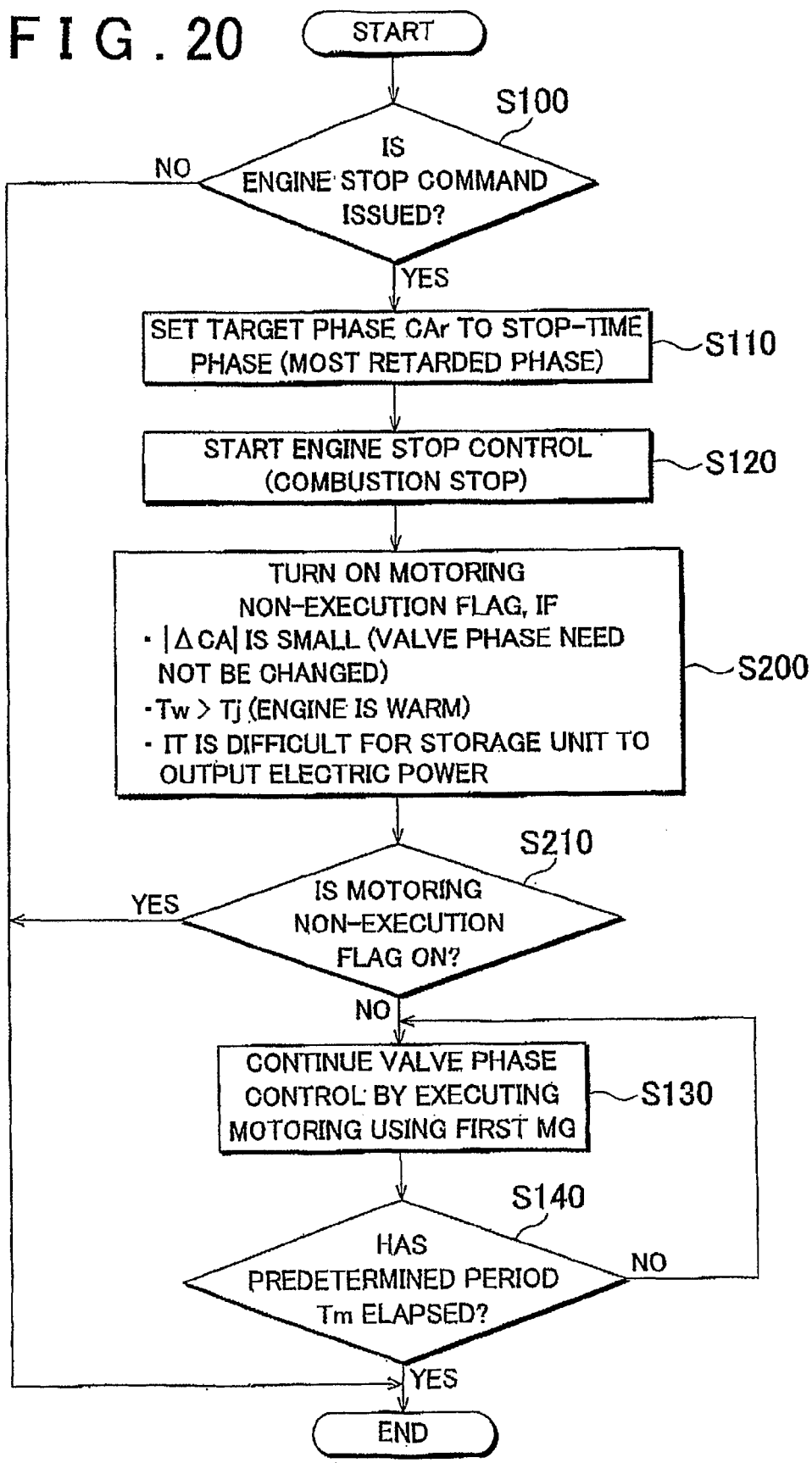
FIG. 20 is a flowchart for executing the third example of control shown in FIG. 19 by executing a software process using the ECU.

FIG. 20 is a flowchart for executing the third example of control shown in FIG. 19 by executing a software process using the ECU.

As shown in FIG. 20, after executing S100 to S120 that are the same as those shown in FIG. 6, the ECU 100 executes S200 and S210. In S200, the ECU 100 executes the process using the motoring non-execution determination unit 195 in FIG. 19. 1) When |ΔCA| is equal to or lower than the predetermined value, 2) when the temperature of the engine (engine coolant temperature Tw) is equal to or higher than the predetermined value, or 3) when it is difficult for the storage unit 700 to output electric power (when the temperature of the storage unit 700 is low and/or when the SOC of the storage unit 700 is low), the ECU 100 turns on a motoring non-execution flag. Alternatively, the motoring non-execution flag may be turned on when at least two of the above-mentioned condition are satisfied.

In addition, in S210, the ECU 100 determines whether the motoring non-execution S flag is turned on in S200. If it is determined that the motoring non-execution flag is not turned on ("NO" in S210), the ECU 100 executes motoring for the predetermined period Tm by executing S130 and S140.

On the other hand, if it is determined that the motoring non-execution flag is turned on ("YES" in S210), the ECU 100 does not execute motoring and stops the engine without executing S130 and S140.

Therefore, according to the third example of control shown in FIGS. 19 and 20, it is possible to increase the amount by which the valve phase can be changed after issuance of an engine stop command without deteriorating the engine startability due to damage given to the storage unit 700 caused by execution of motoring or increasing unnecessary power consumption due to execution of unnecessary motoring.

The third example of control shown in FIGS. 19 and 20 may be combined with the second example of control shown in FIGS. 17 and 18. The control configuration obtained by combining the third example of control with the second example of control together is implemented by adding the motoring non-execution determination unit 195 shown in FIG. 19 to the configuration in FIG. 17 or by executing S200 and S210 in FIG. 20 before executing S130 when an affirmative determination is made in S150 in the flowchart in FIG. 18. With this configuration, when an engine stop command is issued in response to an operation performed by the driver, inappropriate or unnecessary execution of motoring is avoided as according to the third example of control.

The embodiment of the invention that has been described in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A control unit for a variable valve timing mechanism that changes opening/closing timing of at least one of an intake valve and an exhaust valve of an internal combustion engine by a change amount that corresponds to an operation amount of an actuator, the internal combustion engine being mounted in a vehicle that is provided with a rotary electric machine having an output shaft that is connected to an output shaft of the internal combustion engine via a gear, the control unit comprising:

an actuator control unit that controls the operation amount of the actuator based on a deviation of a current value of the opening/closing timing from a target value of the opening/closing timing;

a stop-time position setting unit that sets the target value to a predetermined value in response to a command to stop the internal combustion engine;

a combustion stop processing unit that stops fuel combustion in the internal combustion engine in response to the command to stop the internal combustion engine; and a motoring command unit that rotates the internal combustion engine using the rotary electric machine for a predetermined period in response to the command to stop the internal combustion engine, wherein the vehicle is configured to travel in a cruise mode that is selected from among cruise modes including a first cruise mode in which the vehicle travels using drive power generated by the internal combustion engine and a second cruise mode in which the internal combustion engine is stopped and the vehicle travels using drive power generated by a drive power source that differs from the internal combustion engine, wherein the command to stop the internal combustion engine is a first stop command that is automatically generated based on a vehicle state or a second stop command that is issued in response to an operation performed by a driver, and the control unit further comprises:

a stop process retardation unit that retards the command to stop the internal combustion engine for a predetermined period and then transmits the command to the combustion stop processing unit; and a switching unit that transmits the command to stop the internal combustion engine to the combustion stop processing unit via the stop process retardation unit and that does not transmit the command to stop the internal combustion engine to the motoring command unit, when the first stop command is issued, wherein the switching unit transmits the command to stop the internal combustion engine to the motoring command unit and transmits the command to stop the internal combustion engine to the combustion stop processing unit in such a manner that the command does not pass through the stop process retardation unit, when the second stop command is issued.

2. The control unit according to claim 1, wherein the motoring command unit controls the rotary electric machine so that the internal combustion engine is rotated at a target idle speed by the rotary electric machine.

3. The control unit according to claim 1, further comprising:
a motoring non-execution determination unit that instructs the motoring command unit not to rotate the internal combustion engine using the rotary electric machine when a predetermined condition is satisfied.

4. The control unit according to claim 3, wherein the predetermined condition is satisfied if a storage unit that supplies electric power used to operate the rotary electric machine is in a predetermined state when the command to stop the internal combustion engine is issued.

5. The control unit according to claim 4, wherein the motoring non-execution determination unit determines whether the internal combustion engine should be rotated by the rotary electric machine based on a remaining capacity and a temperature of the storage unit.

6. The control unit according to claim 4, wherein the predetermined state includes at least one of a state in which a remaining capacity of the storage unit is equal to or lower than a predetermined value and a state in which a temperature of the storage unit is equal to or lower than a predetermined value.

7. The control unit according to claim 3, wherein the predetermined condition is satisfied if a temperature of the internal combustion engine is higher than a predetermined value when the command to stop the internal combustion engine is issued.

8. The control unit according to claim 3, wherein the predetermined condition is satisfied if a deviation of the current value of the opening/closing timing from the target value of the opening/closing timing is equal to or lower than a predetermined value when the command to stop the internal combustion engine is issued.

9. A control method for a variable valve timing mechanism that changes opening/closing timing of at least one of an intake valve and an exhaust valve of an internal combustion engine by a change amount that corresponds to an operation amount of an actuator, the internal combustion engine being mounted in a vehicle that is provided with a rotary electric machine having an output shaft that is connected to an output shaft of the internal combustion engine via a gear,
the control method comprising:
controlling the operation amount of the actuator based on a deviation of a current value of the opening/closing timing from a target value of the opening/closing timing;
setting the target value to a predetermined value in response to a command to stop the internal combustion engine;
stopping fuel combustion in the internal combustion engine in response to the command to stop the internal combustion engine; and
rotating the internal combustion engine using the rotary electric machine for a predetermined period in response to the command to stop the internal combustion engine, wherein
the vehicle is configured to travel in a cruise mode-that is selected from among cruise modes including a first cruise mode in which the vehicle travels using drive power generated by the internal combustion engine and a second cruise mode in which the internal combustion engine is stopped and the vehicle travels using drive power generated by a drive power source that differs from the internal combustion engine, and the command to stop the internal combustion engine is a first stop command that is automatically generated based on a vehicle state or a second stop command that is issued in response to an operation of a driver, wherein
the control method further comprises:
executing a control so that transmission of the command to stop the internal combustion engine is retarded for a predetermined period to retard a stop of the internal combustion engine and the command to stop the internal combustion engine, based on which the internal combustion engine is rotated by the rotary electric machine for the predetermined period, is not transmitted, when the first stop command is issued; and
rotating the internal combustion engine for the predetermined period using the rotary electric machine in response to transmission of the command to stop the internal combustion engine and stopping the internal combustion engine without retarding transmission of the command to stop the internal combustion engine, when the second stop command is issued.

10. The control method according to claim 9, wherein the rotary electric machine is controlled so that the internal combustion engine is rotated at a target idle speed by the rotary electric machine.

11. The control method according to claim 9, further comprising:
executing a control so as not to rotate the internal combustion engine using the rotary electric machine when a predetermined condition is satisfied.

12. The control method according to claim 11, wherein the predetermined condition is satisfied if a storage unit that supplies electric power used to operate the rotary electric machine is in a predetermined state when the command to stop the internal combustion engine is issued.

13. The control method according to claim 12, wherein it is determined whether the internal combustion engine should be rotated by the rotary electric machine based on a remaining capacity and a temperature of the storage unit.

14. The control method according to claim 12, wherein the predetermined state includes at least one of a state in which a remaining capacity of the storage unit is equal to or lower than a predetermined value and a state in which a temperature of the storage unit is equal to or lower than a predetermined value.

15. The control method according to claim 11, wherein the predetermined condition is satisfied if a temperature of the internal combustion engine is higher than a predetermined value when the command to stop the internal combustion engine is issued.

16. The control method according to claim 11, wherein the predetermined condition is satisfied if a deviation of the current value of the opening/closing timing from the target value of the opening/closing timing is equal to or lower than a predetermined value when the command to stop the internal combustion engine is issued.

* * * * *